(12) United States Patent
Cai et al.

(10) Patent No.: US 10,451,312 B2
(45) Date of Patent: Oct. 22, 2019

(54) CONDENSING GAS WATER HEATER, CONDENSING HEAT EXCHANGER AND HEAT EXCHANGER PLATE

(71) Applicant: A.O. SMITH (CHINA) WATER HEATER CO., LTD., Nanjing, Jiangsu Province (CN)

(72) Inventors: Maohu Cai, Nanjing (CN); Xiaowei Zhou, Nanjing (CN); Shuohong Jin, Nanjing (CN)

(73) Assignee: A. O. SMITH CORPORATION, Milwaukee, WI (US)

( * ) Notice: Subject to any disclaimer, the term of this patent is extended or adjusted under 35 U.S.C. 154(b) by 78 days.

(21) Appl. No.: 15/661,371

(22) Filed: Jul. 27, 2017

(65) Prior Publication Data

US 2018/0031273 A1 Feb. 1, 2018

(30) Foreign Application Priority Data

Jul. 28, 2016 (CN) .......................... 2016 1 0605684
Oct. 12, 2016 (CN) .......................... 2016 1 0891174

(51) Int. Cl.
*F24H 1/44* (2006.01)
*F28F 3/12* (2006.01)
(Continued)

(52) U.S. Cl.
CPC .............. *F24H 1/445* (2013.01); *F24H 1/145* (2013.01); *F24H 8/006* (2013.01); *F24H 9/128* (2013.01);
(Continued)

(58) Field of Classification Search
CPC .......... F24H 1/445; F24H 1/145; F24H 9/128; F24H 8/006; F28F 3/12; F28F 3/14; Y02B 30/106; F28D 9/0031; F28D 21/0007
See application file for complete search history.

(56) References Cited

U.S. PATENT DOCUMENTS 3,911,843 A * 10/1975 Stowell ................ B21D 53/045
29/890.042
4,232,634 A * 11/1980 Terrell .................... F24H 1/145
122/136 R
(Continued)

FOREIGN PATENT DOCUMENTS

FR 2832790 A1 * 5/2003 ............. F02M 31/20
WO WO-8402178 A1 * 6/1984 ........... B21D 53/045

*Primary Examiner* — Steven S Anderson, II
(74) *Attorney, Agent, or Firm* — Michael Best & Friedrich LLP

(57) ABSTRACT

The invention discloses a condensing gas water heater, a condensing heat exchanger as well as heat exchanger plates. The condensing heat exchanger comprises: a housing and at least one heat exchanger plate disposed in the housing; the heat exchanger plate comprises a first metal board and a second metal board butting each other, wherein a surface of the first metal board and a surface of the second metal board which butt each other are butting surfaces, and two outer surfaces opposite to the butting surfaces are a first surface and a second surface, respectively; at least one of the first metal board and the second metal board is formed with a convex flow guide portion along a direction away from the butting surface; the first metal board and the second metal board form a fluid passage via the flow guide portion.

25 Claims, 12 Drawing Sheets

(51) Int. Cl.
*F24H 9/12* (2006.01)
*F24H 1/14* (2006.01)
*F24H 8/00* (2006.01)
*F28D 9/00* (2006.01)
*F28D 21/00* (2006.01)

(52) U.S. Cl.
CPC ....... *F28D 9/0031* (2013.01); *F28D 21/0007* (2013.01); *F28F 3/12* (2013.01); *Y02B 30/106* (2013.01)

(56) References Cited

U.S. PATENT DOCUMENTS

| | | | | |
|---|---|---|---|---|
| 2003/0005892 A1* | 1/2003 | Baese | ................... | F23D 14/02 |
| | | | | 122/448.1 |
| 2007/0062681 A1* | 3/2007 | Beech | ................ | F28D 1/0308 |
| | | | | 165/170 |
| 2015/0184951 A1* | 7/2015 | Lee | ...................... | F28F 1/32 |
| | | | | 165/151 |

* cited by examiner

CONDENSING GAS WATER HEATER, CONDENSING HEAT EXCHANGER AND HEAT EXCHANGER PLATE

FIELD OF THE INVENTION

The invention relates to the gas water heater field, and in particular to a condensing gas water heater, a condensing heat exchanger as well as a heat exchanger plate.

BACKGROUND OF THE INVENTION

At the time when a gas water heater operates, a substantial amount of flue gas is discharged, and the temperature reaches up to 180° C. or so. A common gas water heater fails to utilize such a portion of heat and the heat is wasted. In addition, when the high-temperature flue gas, which may reach up to 180° C. or so is discharged by the gas water heater, a heat transfer heats up a body and a user may be burnt.

In order to efficiently utilize the high-temperature flue gas mentioned above and prevent the body from overheating, a condensing gas water heater is available. The condensing gas water heater further comprises condensing heat exchangers when compared with a common gas water heater, and the heat in the high-temperature flue gas is absorbed by the condensing heat exchanger, so as to heat cold water, and hence to achieve the effects of energy saving and environmental protection. As a result, the temperature of the flue-gas ultimately discharged can be significantly decreased and users are prevented from getting burnt. In a word, a condensing gas water heater has become increasingly valued and popular with the public, owing to characteristics of energy saving and environmental protection.

SUMMARY OF THE INVENTION

It is an object of the invention to provide a condensing gas water heater, a condensing heat exchanger as well as a heat exchanger plate, which can increase heat exchange efficiency, reduce cost, realize a modular assembly and improve ease of mounting.

The above-mentioned object of the invention can be realized using the following technical solutions:

A condensing heat exchanger, comprising: a housing and at least one heat exchanger plate disposed in the housing; the heat exchanger plate comprises a first metal board and a second metal board butting each other, wherein a surface of the first metal board and a surface of the second metal board which butt each other are butting surfaces, and two outer surfaces opposite to the butting surfaces are a first surface and a second surface, respectively;

at least one of the first metal board and the second metal board is formed with a convex flow guide portion along a direction away from the butting surface; the first metal board and the second metal board form a fluid passage via the flow guide portion; and the housing is provided with a flue gas inlet and a flue gas outlet, flue gas can flow into from the flue gas inlet, contact and exchange heat with the first surface and/or the second surface of the heat exchange plate, and flow out of the flue gas outlet.

Further, the heat exchanger plate is fitted with the housing to form a flue gas passage that enables flue gas to flow along a predetermined direction, and the flue gas flows into from the flue gas inlet, contacts and exchanges heat with the first surface and/or second surface when flowing through the flue gas passage, and flows out from the flue gas outlet.

Further, the heat exchanger plate have a first end and a second end opposite to each other, wherein at least one of the first end and the second end is fitted with the housing to form a flue gas guide port.

Further, the position of the first end of the heat exchanger plate is higher than that of the second end, and the second end is fitted with the housing to form the flue gas guide port, and after flowing into from the flue gas inlet, the flue gas firstly contacts and exchanges heat with the first surface of the heat exchanger plate, next flows out from the flue gas guide port, then contacts and exchanges with the second surface of the heat exchanger plate, and flows out from the flue gas outlet.

Further, the heat exchanger plate has a first end and a second end, and the fluid passage is disposed reciprocally between the first end and second end.

Further, the first end is a top end, the second end is a bottom end, and the direction along the top end to the bottom end is a first direction, and the fluid passage is reciprocally disposed along a second direction having a predetermined angle to the first direction while extending along the first direction.

Further, the predetermined angle is 90 degree.

Further, the fluid passage is provided with a water inlet for water input and a water outlet for water output, the water inlet is provided with a first connector, and the water outlet is provided with a second connector, and wherein the first connector can be communicated with a water input pipeline, and the second connector can be communicated with a main heat exchanger.

Further, the fluid passage is provided with a water inlet for water input and a water outlet for water output, when there are a plurality of the heat exchange plates, the condensing heat exchanger further comprises a first multi-passage connector and a second multi-passage connector for connecting the plurality of the heat exchanger plates in parallel, wherein the first multi-passage connector is used to connect in parallel the water inlets of the plurality of the heat exchanger plates; and the second multi-passage connector is used to connect in parallel the water outlets of the plurality of the heat exchanger plates.

Further, the flue gas inlet of the housing is used for communication with a smoke exhaust port of a fan; the flue gas outlet of the housing is used for communication with the smoke exhaust port; and a bottom of the housing is provided with an outlet for discharging condensed water.

Further, a first part for disposing the heat exchanger plate and a second part for collecting flue gas, the flue gas inlet is disposed on a wall surface of the first part, the flue gas outlet is disposed on a wall surface of the second part, and the first part is communicating with the second part.

Further, a side wall and/or a bottom wall of the housing is provided with at least one limiting member for limiting the heat exchange plate.

Further, edge of the heat exchanger plate is provided with a mounting portion, and the mounting portion of the heat exchanger plate and the limiting member butt each other.

Further, the limiting member is at least one of a stop surface and a stop point formed on an inner wall of the housing or a lug or a screw disposed on the inner wall of the housing.

Further, a first flow guide portion is formed on the first metal board, a second flow guide portion is formed on the second metal board, the first metal board and the second metal board form the fluid passage by butting the first flow guide portion and the second flow guide portion.

Further, the heat exchanger plate is disposed to face the flue gas inlet, and have a predetermined distance to the flue gas inlet.

Further, there are at least two of the heat exchange plates, and two neighboring heat exchanger plates are connected to each other by way of serial or parallel connection.

Further, the fluid passage of the heat exchanger plate is provided with a water inlet for water input and a water outlet for water output, and when there are a plurality of the heat exchange plates, a plurality of the water inlets are connected in parallel, and a plurality of the water outlets are connected in parallel.

Further, the condensing heat exchanger comprises: a first communication member and a second communication member;

the first communication member goes across the water inlets of the plurality of the heat exchanger plates, and is provided with a first opening that can be communicated with the water inlet of each of the heat exchanger plates; and the second communication member goes across the water outlets of the plurality of the heat exchanger plates, provided with a second opening that can be communicated with the water outlet of each of the heat exchanger plates.

Further, the condensing heat exchanger comprises: at least one first sub-connector and at least one second sub-connector;

the first sub-connectors are used to communicate with the water inlets of the two neighboring heat exchanger plates; and the second sub-connectors are used to communicate with the water outlets of the two neighboring heat exchanger plates.

Further, the water inlet and the water outlet of the heat exchanger plate are formed with circumferential projection portion, respectively, the projection portions at the water inlet position of the two neighboring heat exchanger plates butt each other, and the projection portions of the water outlet position of the two neighboring heat exchanger plates butt each other.

Further, the fluid passage is reciprocally disposed, it comprises: sub-fluid passages and a transition portion communicating with two neighboring sub-fluid passages; the heat exchanger plate is provided with a communication fluid passage which communicates the transition portion with the water outlet of the fluid passage.

Further, the fluid passage is reciprocally disposed up and down in the gravity direction, the sub-fluid passages are extending in the gravity direction, and the communication fluid passage is disposed close to a lower end of the heat exchanger plate and located in the position below the transition portion.

Further, a sectional dimension of the communication fluid passage is less than that of the sub-fluid passages.

A condensing gas water heater, comprising the condensing heat exchanger in any one of the above.

Further, the condensing gas water heater further comprises:

a combustor;

a main heat exchanger communicated with the condensing heat exchanger, a frequency conversion fan capable of driving air into the gas water heater;

the flue gas generated during operation of the combustor is discharged from the gas water heater after sequentially passing through the main heat exchanger and the condensing heat exchanger, and a control unit capable of controlling operation of the frequency conversion fan according to a size of thermal load of the combustor.

Further, the frequency conversion fan is communicated with the main heat exchanger and the condensing heat exchanger, the frequency conversion fan comprises a fan inlet and a fan outlet, and the fan outlet is communicated with the flue gas inlet of the condensing heat exchanger.

Further, the condensing gas water heater further comprises:

a wind pressure sensor assembly for detecting a pressure signal upstream an impeller of the frequency conversion fan, and a signal output end of the wind pressure sensor assembly connects with the control unit; and the control unit comprises: a memory storing a corresponding relationship between the pressure signal upstream the impeller of the frequency conversion fan and the thermal load of the combustor, and a controller capable of controlling the operation of the frequency conversion fan in accordance with the corresponding relationship.

A heat exchanger plate, applicable in a flue gas passage, comprising:

a first metal board and a second metal board butting each other, wherein a surface of the first metal board and a surface of the second metal board which butt each other are butting surfaces;

at least one of the first metal board and the second metal board is formed with a convex flow guide portion along a direction away from the butting surface;

the first metal board and the second metal board form a fluid passage via the flow guide portion.

Further, a material of the heat exchanger plate includes stainless steel.

Further, the heat exchanger plate have a first end and a second end opposite to each other, and the fluid passage is disposed reciprocally between the first end and the second end.

Further, the first end is a top end and the second end is a bottom end, and the fluid passage is reciprocally disposed along a second direction having a predetermined angle to a first direction while extending along the first direction from the top end to the bottom end.

Further, edge of the heat exchanger plate is provided with a mounting portion.

Further, a width of the mounting portion is more than 5 millimeters.

Further, the mounting portion is provided with a reinforcing bar.

Further, the mounting portion is provided with a non-return portion.

Further, the mounting portion is provided with a positioning portion.

Further, the flow guide portion of the heat exchanger plate is produced by a blowing-up process.

It can be seen from the technical solutions provided in embodiments of the present application, the heat exchanger plate in the condensing heat exchanger in the present application is formed with a fluid passage by a butting way, when mounted in the housing, the heat exchanger plate can be fitted with the housing to form a flue gas passage that enables flue gas to move along a predetermined direction. The heat exchanger plate in use can sufficiently exchange heat with high-temperature flue gas flowing in the flue gas passage to heat up the water flowing through the fluid passage. On the whole, the condensing heat exchanger has high heat exchange efficiency and a lower manufacture cost. Additionally, the heat exchanger plate is assembled with the housing in a modular manner, in which the number of the heat exchanger plate is adjustable, and quite conveniently mounting can fulfill actual demands for different liters and different scenes.

Further, the heat exchanger plate disposed in the housing can implement a primary heat exchange on a first surface with the high-temperature flue gas flowing into from the flue gas inlet of the housing, and then the flue gas flows out from the flue gas outlet after a secondary heat exchange with a second surface as it flows. On the whole, the above-mentioned heat exchanger plates can fully absorb heat in the flue gas, and further improve heat exchange efficiency in the process of secondary heat exchange with the high-temperature flue gas.

DETAILED DESCRIPTION OF THE INVENTION

The technical solutions of the present invention will be described in detail below with references to the figures and embodiments, it will be appreciated that those Examples are merely illustrative, and are not to be construed as limitation on the scope of the invention. After those skilled in the art have read the invention, modifications in various equivalent forms fall within the scope as defined by the appended claims in the present application.

The invention provides a condensing gas water heater, a condensing heat exchanger as well as heat exchanger plates, which can further increase heat exchange efficiency, reduce cost, realize a modular assembly and improve ease of mounting.

Figure 1:
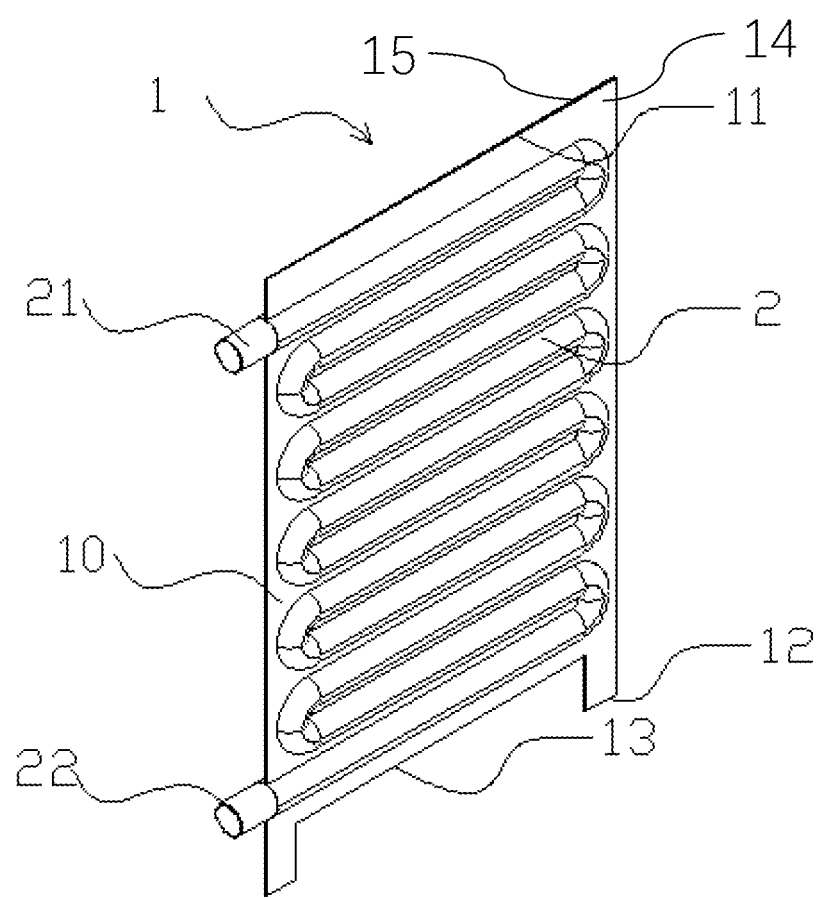
FIG. 1 is a structural diagram of a heat exchanger plate provided in embodiments in the present application.
Figure 2:
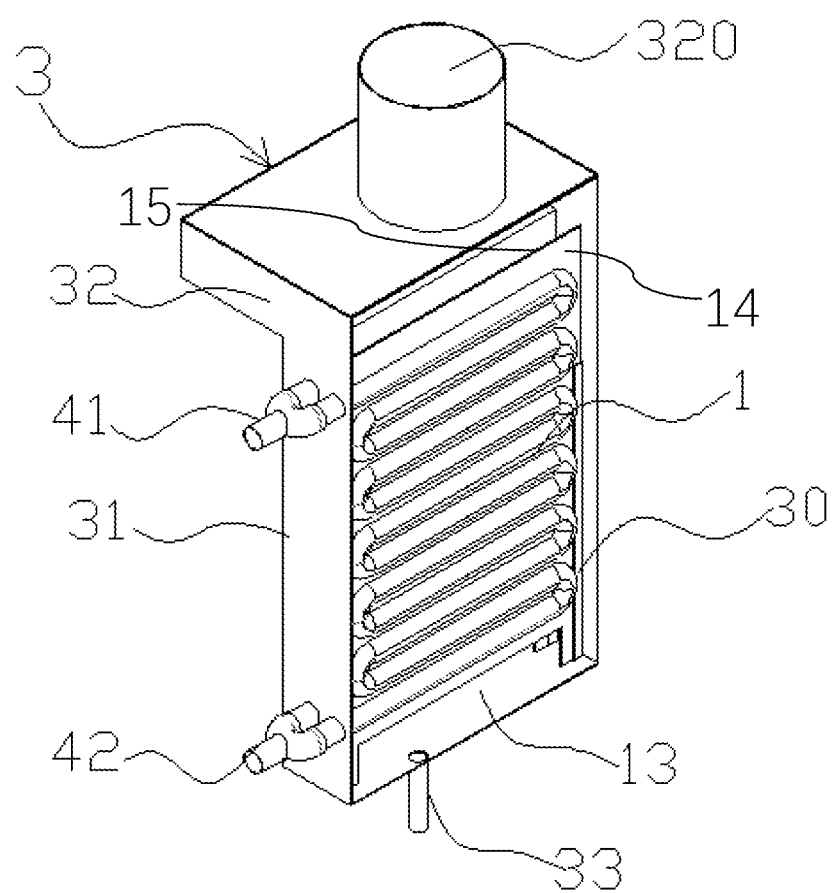
FIG. 2 is a structural diagram of a condensing heat exchanger provided in embodiments in the present application.
Figure 3:
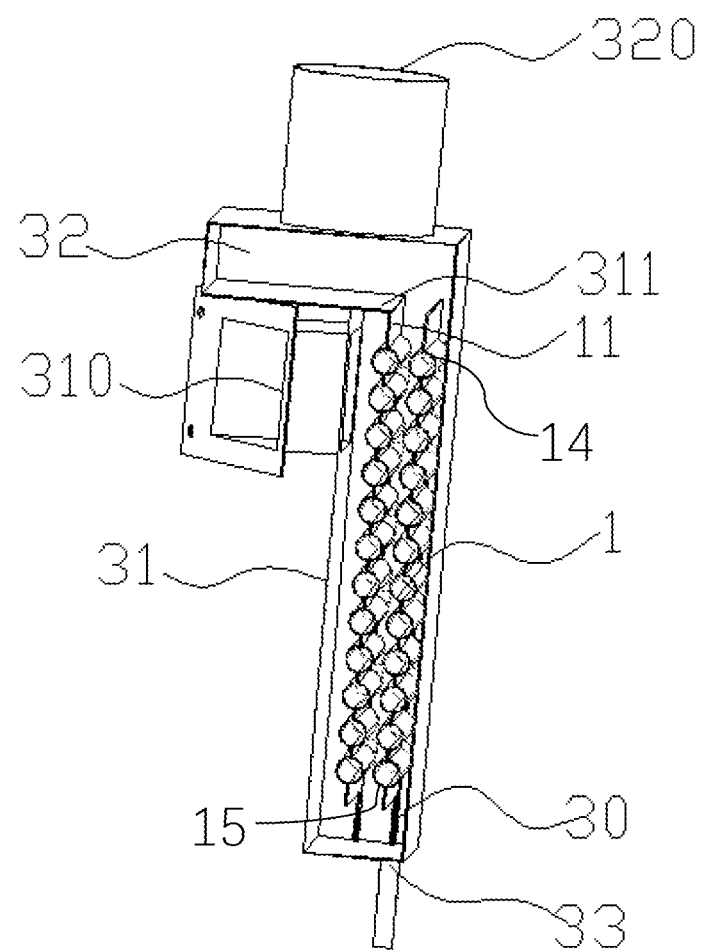
FIG. 3 is a structural diagram of a condensing heat exchanger provided in embodiments in the present application.

Referring to FIG. 1, a heat exchanger plate 1 provided in embodiments in the present application is applicable in a flue gas passage, it comprises: a first metal board 14 and a second metal board 15 butting each other, wherein a surface of the first metal board 14 and a surface of the second metal board 15 which butt each other are butting surfaces; at least one of the first metal board 14 and the second metal board 15 is formed with a convex flow guide portion along a direction away from the butting surface; and the first metal board 14 and the second metal board 15 form a fluid passage 2 by the flow guide portion.

In this embodiment, the heat exchanger plate 1 can be used in a flue gas passage environment, and exchanges heat with high-temperature flue gas in the flue gas passage to absorb heat energy in the high-temperature flue gas, and passes the energy to water to be heated in the fluid passage 2 inside the heat exchanger plate 1, to heat up the water.

Specifically, the heat exchanger plate 1 can comprise a first metal board 14 and a second metal board 15 butting each other, wherein at least one of the first metal board 14 or the second metal board 15 is formed with a convex flow guide portion. When the first metal board 14 and the second metal board IS butt each other, a fluid passage 2 that can circulate the water to be heated can be formed by the flow guide portion.

In this embodiment, the fluid passage 2 formed on the heat exchanger plate 1 can be provided with a water inlet 21 for water input and a water outlet 22 for water output.

In one embodiment, the position of the water inlet 21 is higher than the position of the water outlet 22, a water stream can flow into via the water inlet 21 through the fluid passage 2 in the gravity direction and flow out of the water outlet 22. Since the position of the water inlet 21 is higher than the position of the water outlet 22, an overall flowing direction of the water stream is consistent with the gravity direction, this is beneficial in reducing resistance of the water stream in the flowing process.

In one embodiment, a material of the heat exchanger plate 1 can include stainless steel.

In this embodiment, a material of the first metal board 14 or the second metal board 15 of the heat exchanger plate 1 can be stainless steel. When the heat exchanger plate 1 made of the stainless steel is used in the flue gas passage environment with a high temperature and a high humidity, the heat exchanger plate 1 can have high temperature resistance and corrosion resistance properties, so as to extend service life of the heat exchanger plate 1. Besides, the heat exchanger plate 1 made of the stainless steel has a preferable thermal conductivity, and can preferably absorb the heat in the high-temperature flue gas. As a matter of course, the material of the heat exchanger plate 1 is not limited to the example above, and it may also be other materials, which is not specifically limited herein in the present application.

The manner by which the first metal board 14 and the second metal board 15 butt each other in this embodiment could be braze welding, which ensures tightness of the first metal board 14 and the second metal board 15 in welding positions. As a matter of course, the manner by which the first metal board 14 and the second metal board 15 butt each other may also be another one, which is not specifically limited herein in the present application.

In one embodiment, the flow guide portion of the heat exchanger plate 1 can be produced by a blowing-up process.

In this embodiment, the flow guide portion of the heat exchanger plate 1 produced by the blowing-up process enables the heat exchanger plate 1 to have a higher heat transmission efficiency when heat exchange is conducted between the heat exchanger plate 1 and the high-temperature flue gas in the flue gas passage. In addition, when the flow guide portion of the heat exchanger plate 1 is produced by the blowing-up process, the global cost could be lower.

The heat exchanger plate 1 in embodiments of the present application is formed by a butting way, and the flow guide portion formed on the butting surface forms the fluid passage 2. When used in the flue gas passage, the heat exchanger plate 1 can be fully heat exchanged with the high-temperature flue gas flowing in the flue gas passage, to heat up the water flowing through in the fluid passage 2. On the whole, the cost of manufacture is lower when the heat exchanger plate 1 is produced by the above-mentioned blowing-up process.

In addition, the heat exchanger plate 1 is formed with a plate-like structure of the fluid passage 2 by the butting way. During heat exchange, the heat exchanger plate 1 can be sufficiently contacted with the high-temperature flue gas, wherein the fluid passage 2 of the heat exchanger plate 1 could be in contact with the high-temperature flue gas for heat exchanging, in order to absorb the heat in the high-temperature flue gas and passes the heat to the water in the fluid passage 2; meanwhile the metal board of non-fluid passage on the heat exchanger plate 1 can also be heat exchanged with the high-temperature flue gas, in order to absorb the heat in the high-temperature flue gas and passes the heat into the fluid passage 2, and hence passes the heat to the water in the fluid passage 2, so as to sufficiently heat up the water flowing through the fluid passage 2, and therefore heat exchange efficiency of the heat exchanger plate 1 is higher on the whole.

In one embodiment, the heat exchanger plate 1 has a first end and a second end opposed to each other, and the fluid passage 2 is disposed reciprocally between the first end and the second end.

In this embodiment, the heat exchanger plate 1 can be not only of a flat panel-like structure but also of a plate-like structure with a predetermined bending angle on the whole.

As a matter of course, a shape of the heat exchanger plate 1 can also be another one, to be specific, an adaptive change could be made thereto according to a mounting environment, which is not specifically limited herein in the present application.

Specifically, the heat exchanger plate 1 can have a first end and a second end opposite to each other, and the fluid passage 2 can be disposed reciprocally between the first end and second end.

When the fluid passage 2 is formed in the manner of being disposed reciprocally between the first end and second end, this is beneficial in making full use of sheet material area of the heat exchanger plate 1 and forming the fluid passage 2 with greater length, in the case of the fluid passage 2 with greater length, when a water stream flows inside the passage, the time during which the water stream flows through the fluid passage 2 can be accordingly extended so that the water can be sufficiently heated, thereby improving heat exchange efficiency of the heat exchanger plate 1.

In one embodiment, the first end is a top end 11 and the second end is a bottom end 12, and the fluid passage 2 is reciprocally disposed along a second direction having a predetermined angle to a first direction while extending along the first direction from the top end 11 to the bottom end 12.

In this embodiment, the heat exchanger plate 1 can be integrally of a rectangular plate-like structure. As a matter of course, shapes of the heat exchanger plate 1 can also be another one, such as circular, trapezoidal, etc., and can be adaptively changed according to the mounting environment, which is not specifically limited herein in the present application. The top end 11 and the bottom end 12 can be a group of opposite sides of a rectangle shape, taking the heat exchanger plate 1 being of a rectangular plate-like structure as an example.

In this embodiment, the fluid passage 2 is reciprocally disposed along the second direction having a predetermined angle to the first direction while extending along the first direction from the top end 11 to the bottom end 12, in order to extend the length of the fluid passage 2, thereby improving heat exchange efficiency of the heat exchanger plate 1.

Wherein, the first direction can be the gravity direction, when the first direction is the gravity direction, this is beneficial in reducing resistance to flowing of a water stream. Additionally, the predetermined angle may be 90 degree, and it may certainly also be another angle, e.g., an arbitrary angle between 75 degree and 90 degree, which is not specifically limited herein in the present application. In this embodiment, when the fluid passage 2 is reciprocally disposed in the overall flowing direction, not only the heat exchange efficiency of the heat exchanger plate 1 can be improved, but also the resistance to the water stream can be reduced, so that the water entered from a water input pipeline can smoothly flow under a lower hydraulic pressure.

Additionally, in the case of flowing of high-pressure flue gas, at least part of the flue gas flows in a direction opposite to the flowing direction of the water stream. When the flowing direction of the flue gas is contrary to that of the water stream, this is beneficial in increasing a temperature difference between the flue gas and the water stream, and hence improving efficiency of heat exchange.

In one embodiment, edge of the heat exchanger plate 1 is provided with a mounting portion 10.

In this embodiment, when the first metal board 14 and the second metal board 15 of the heat exchanger plate 1 are butting each other, a mounting portion 10 is provided at the butted edge. To be specific, the mounting portion 10 can be a circumferential protrusion or a local protrusion of the heat exchanger plate 1. As a matter of course, the mounting portion 10 can also be other forms, which is not specifically limited herein in the present application.

In this embodiment, the mounting portion 10 has a predetermined width, so that the heat exchanger plate 1 can be limited by the mounting portion 10 when mounted. To be specific, in order to ensure that the heat exchanger plate 1 can be reliably limited when mounted, the width of the mounting portion 10 can be more than 5 millimeters. As a matter of course, the width of the mounting portion 10 can be adaptively adjusted according to differences in the actual mounting environment fitted therewith, which is not specifically limited herein in the present application.

Further, as the heat exchanger plate 1 is limited by the mounting portion 10, the mounting portion 10 is subjected to greater forces. In order to ensure an intensity of the heat exchanger plate 1 in its entirety, the mounting portion 10 can be provided with a reinforcing bar to improve an ability of the mounting portion 10 to withstand forces, thereby improving intensity and reliability of the heat exchanger plate 1 in its entirety.

In one embodiment, the mounting portion 10 can be provided with a non-return portion.

In this embodiment, in order to ensure that no larger displacement of the heat exchanger plate 1 would occur due to effects of impact of external force after mounted in place, the mounting portion 10 can be provided with a non-return portion. The non-return portion can be used to limit the position of the heat exchanger plate 1, avoid the occurrence of its larger displacement, and prevent it from being disengaged from the mounting position or being collided with the housing 3. To be specific, the structure of the non-return portion can be fitted with the housing 3 on which the portion is mounted to form a snap-fit structure.

When the heat exchanger plate 1 is mounted in place, the snap-fit action formed after the non-return portion is fitted with the housing 3 on which the portion is mounted is limited. As a matter of course, the structure of the non-return portion is not limited to the above-mentioned examples, those skilled in the art can also make other changes under the enlightenment of the technical spirit of the present application, as long as the implemented functions and the achieved effects therein are identical or similar to those in the present application, and should be covered in the protection scope of the present application.

In one embodiment, the mounting portion 10 can be provided with a positioning portion.

In this embodiment, the mounting portion 10 can be provided with a positioning portion. In the mounting process, the positioning portion can be used for locating the heat exchanger plate 1. When the positioning portion is mounted in a predetermined position, it indicates that the heat exchanger plates 1 have been mounted in place on the whole. Accuracy and convenience of the heat exchanger plate 1 when mounted can be ensured by providing a positioning portion on the mounting portion 10.

Specifically, the form of the positioning portion can be a projection disposed at a position of one end of the mounting portion 10 which is close to the heat exchanger plate 1. After the projection is snap-fitted in the corresponding mounting position, it indicates that the heat exchanger plates 1 have been mounted in place. As a matter of course, the concrete form of the positioning portion can also be another one, which is not specifically limited herein in the present application.

Referring to FIGS. 2 to 5, embodiments of the present application provide a condensing heat exchanger, which can comprise: a housing 3 and at least one heat exchanger plate 1 disposed within the housing 3; the heat exchanger plate 1 comprises a first metal board 14 and a second metal board 15 butting each other, wherein a surface on the first metal board 14 and a surface of the second metal board 15 butting each other are butting surfaces, and two outer surfaces opposite to the butting surfaces are a first surface and a second surface, respectively: at least one of the first metal board 14 and the second metal board 15 is formed with a convex flow guide portion along the direction away from the butting surface: the first metal board 14 and the second metal board 15 form a fluid passage 2 by the flow guide portion; the housing 3 is provided with a flue gas inlet 71, 310 and a flue gas outlet 320, flue gas can flow in from the flue gas inlet 71, 310, contact and exchange heat with the first surface and/or second surface of the heat exchanger plate 1, and flow out of the flue gas outlet 320.

In this embodiment, the heat exchanger plate 1 can be a specific application of the heat exchanger plate 1 in the condensing heat exchanger in the above-mentioned embodiments, see the above-mentioned embodiments for its specific configuration, detailed description thereof will be omitted. In this embodiment, the heat exchanger plate 1 can form a condensing heat exchanger upon being disposed in the housing 3.

In this embodiment, the number of the heat exchanger plate 1 can be at least one, i.e., one or more, to be specific, the number of the heat exchanger plate 1 can be correspondingly adjusted according to differences in scenes actually used. For example, when used in a condensing gas water heater, the number of the heat exchanger plate 1 can match liters of the condensing gas water heater. A condensing gas water heater having more liters can be provided with a larger number of heat exchanger plates, while the condensing gas water heater having less liters can be provided with a smaller number of heat exchanger plates. When the condensing heat exchanger is provided with a plurality of pieces of the heat exchanger plates 1, the plurality of pieces of the heat exchanger plates 1 can be connected in parallel to form a group of heat exchanger plates. When the group of the above-mentioned plurality of pieces of heat exchanger plates connected in parallel is mounted, the group of heat exchanger plates only needs to be integrally plugged in the housing 3, this is beneficial in realizing a modular assembly, thereby improving ease of mounting and removal.

In one application scenario, when the plurality of pieces of the heat exchanger plates 1 are mounted, it is also possible to connect the plurality of pieces of the heat exchanger plates 1 in parallel after each of the heat exchanger plates 1 is respectively mounted in place.

In another application scenario, if it is found when debugging or using that the water heated by the condensing heat exchanger does not reach the desired temperature in the condensing gas water heater, in this case, the corresponding heat exchanger plates 1 can be connected in parallel on the basis of the original one or more pieces of heat exchanger plates 1, so as to increase the heating water temperature of the condensing heat exchanger.

To sum up, extremely flexibly adjusting the number of the heat exchanger plates 1 and quite conveniently mounting can fulfill actual demands for different liters and different scenes.

Where the housing 3 is provided with a flue gas inlet 71, 310 and a flue gas outlet 320. In use, flue gas can flow into from the flue gas inlet 71, 310, and after contacts with the first surface and the second surface of the heat exchanger plate 1 for heat exchanging, the flue gas flows out through the flue gas outlet 320.

The heat exchanger plate 1 in the condensing heat exchanger in embodiments of the present application is formed by the butting way with a lower cost of manufacture, and the fluid passage 2 is formed by the flow guide portion formed on the butting surface, the heat exchanger plate 1 has higher heat exchange efficiency. To be specific, during heat exchange, the heat exchanger plate 1 can be sufficiently contacted with the high-temperature flue gas, wherein the fluid passage 2 of the heat exchanger plate 1 could be in contact with the high-temperature flue gas for heat exchanging, in order to absorb the heat in the high-temperature flue gas, and passes the heat to the water in the fluid passage 2; meanwhile the metal board of non-fluid passage on the heat exchanger plate 1 can also be heat exchanged with the high-temperature flue gas, in order to absorb the heat in the high-temperature flue gas, passes the heat to the fluid passage 2, and hence passes the heat to the water in the fluid passage 2, so as to sufficiently heat up the water flowing through the fluid passage 2, and therefore heat exchange efficiency of the heat exchanger plate 1 is higher on the whole.

Additionally, the heat exchanger plates and the housing are assembled in a modular manner, and extremely flexibly adjusting the number of the heat exchanger plates and quite conveniently mounting can fulfill actual demands for different scenes.

In one embodiment, the heat exchanger plates 1 are fitted with the housing 3 to form a flue gas passage that enables flue gas to move along a predetermined direction, the flue gas flows in from the flue gas inlet 71, 310, and after contacts with the first surface and/or second surface for heat exchanging when flowing through the flue gas passage, the flue gas flows out from the flue gas outlet 320.

In this embodiment, upon being disposed in the housing 3, the heat exchanger plate 1 is fitted with the housing 3, which can form a flue gas passage. Specifically, the flue gas passage can guide the flow of the flue gas, such that it moves in the predetermined direction.

Specifically, after flowing in from the flue gas inlet 71, 310 and being contacted with at least one of the first surface and the second surface of the heat exchanger plate 1 along the flue gas passage for heat exchanging, the flue gas flows out from the flue gas outlet 320.

In this embodiment, the flue gas passage is formed by way of fitting the heat exchanger plate 1 with the housing 3, which can make full use of structure of the heat exchanger plate 1 per se, allow it to be heat exchanged with the high-temperature flue gas to the greatest extent, so as to improve heat exchange efficiency of the condensing heat exchanger. With regard to a flue gas passage being manufactured with a deflector being provided separately, the above-mentioned way not only can save materials, save unnecessary production process and cost, but also can allow the high-temperature flue gas to be contacted with the heat exchanger plate 1 for heat exchanging at all times, so as to also make full use of heat that cannot be passed to water on a peripheral deflector.

In addition, when the flue gas passage of the above-mentioned condensing heat exchanger formed by way of fitting the heat exchanger plate 1 with the housing 3 is in use and the high-temperature flue gas flows in the flue gas passage, all of the high-temperature flue gas can flow along the surface of the heat exchanger plate 1, and can fully contact the projection of the fluid passage 2 of the heat exchanger plate 1 and compartments between the projections for heat-exchanging when the flue gas flows, so as to fully pass heat energy to the heat exchanger plate 1, and therefore the condensing heat exchanger in the present application has excellent heat exchange efficiency.

In one embodiment, the heat exchanger plates 1 have a first end and a second end opposed to each other, wherein at least one of the first end and the second end is fitted with the housing 3 to form a flue gas guide port.

In this embodiment, the heat exchanger plate 1 can be not only of a flat panel-like structure but also of a plate-like structure with a predetermined bending angle on the whole.

As a matter of course, a shape of the heat exchanger plates 1 can also be another one, to be specific, an adaptive change could be made thereto according to a mounting environment, which is not specifically limited herein in the present application.

The heat exchanger plates 1 can have a first end and a second end opposed to each other, wherein one end of the heat exchanger plates 1 can be fitted with the housing 3 to form a flue gas guide port, in order to facilitate flowing of high-temperature flue gas. Specifically, one end of the heat exchanger plates 1 can be provided with a fluting 13. When the heat exchanger plates 1 are mounted in the housing 3, a flue gas guide port can be formed by the fluting 13 and the housing 3. Additionally, an end of the heat exchanger plate 1 may also have no fluting. When the heat exchanger plate 1 is mounted in the housing 3, its end can be reserved with a predetermined distance from the housing 3, so as to form the flue gas guide port.

Certainly, the specific arrangement and position of the flue gas guide port can be correspondingly changed according to the shape, relative positions of the housing 3 and the heat exchanger plate 1, which is not specifically limited herein in the present application.

In a specific embodiment, the heat exchanger plates 1 have a first end and a second end opposed to each other, the first end of the heat exchanger plate 1 closest to the flue gas inlet 71, 310 is butting an inner wall of the housing 3, and the second end of the heat exchanger plate 1 and a bottom wall of the housing 3 form the flue gas guide port.

In this embodiment, the number of the heat exchanger plates 1 can be either one or more than one. When the number of the heat exchanger plates 1 is more than one, those plates can be arranged in parallel, wherein the first end of the heat exchanger plate 1 closest to the flue gas inlet 71, 310 can be butting an interior of the housing 3, and its second end opposite to the first end can form the flue gas guide port with the bottom wall of the housing 3.

When one end of the heat exchanger plate 1 closest to the flue gas inlet 71, 310 butts the inner wall of the housing 3, a barrier to flue gas can be formed. The high-temperature flue gas can flow downwardly along the first surface of the heat exchanger plate 1 after entrance from the flue gas inlet 71, 310, and flow out from the flue gas guide port to heat exchange with the second surface of the heat exchanger plate 1 after flowing to the flue gas guide port.

In another specific embodiment, the first end is a top end 11, and the second end is a bottom end 12, and the position of the top end 11 of the heat exchanger plate 1 is higher than that of the flue gas inlet 71, 310.

In this embodiment, the heat exchanger plates 1 can be integrally flat panel-like and have the top end 11 and the bottom end 12 opposed to each other. After the heat exchanger plates 1 are mounted in the housing 3, the top end 11 is located above the bottom end 12.

In this embodiment, the position of the top end 11 of the heat exchanger plates 1 can be higher than that of the flue gas inlet 71, 310, thereby playing a certain role of guiding the flue gas entering the housing 3 from the flue gas inlet 71, 310 and preventing the high-temperature flue gas from flowing out directly from the top end 11 of the heat exchanger plates 1. Specifically, when the top end 11 of the heat exchanger plates 1 is higher than the position of the flue gas inlet 71, 310, the high-temperature flue gas entering from the flue gas inlet 71, 310 can flow along the first surface of the heat exchanger plates 1 and be sufficiently heat exchanged with the heat exchanger plates 1.

Further, on a side of the inner wall of the housing 3 close to the flue gas inlet 71, 310 an extension portion 311 is formed inward; the top end 11 butts the extension portion 311. When entering the housing 3 from the flue gas inlet 71, 310, the flue gas does not directly flow out from the top end 11 of the heat exchanger plates 1. All of the flue gas can flow along the surface of the heat exchanger plates 1 to sufficiently heat exchange with the heat exchanger plates 1, which is hence beneficial in improving the heat exchange efficiency of the condensing heat exchanger.

In one embodiment, the position of the first end of the heat exchanger plates 1 is higher than the second end, and the second end is fitted with the housing 3 to form the flue gas guide port; the flue gas is firstly in contact with the first surface of the heat exchanger plate 1 for heat exchanging after flowing in from the flue gas inlet 71, 310, and then flows out from the flue gas guide port to contact the second surface of the heat exchanger plate 1 for heat exchanging, and hence flows out from the flue gas outlet 320.

In this embodiment, the first end position of the heat exchanger plate 1 can be higher than that of the second end. Specifically, when, for example, the heat exchanger plate 1 is of a rectangular plate-like structure, its first end can be a first short side, and the second end can be a second short side. When the concrete structure of the above-mentioned heat exchanger plate 1 is not limited to the examples above, those skilled in the art can make adaptive changes according to actual requirements for mounting, which is not specifically limited herein in the present application.

In this embodiment, the underlying second end can be fitted with the housing 3 to form the flue gas guide port. After the high-temperature flue gas flows in from the flue gas inlet 71, 310, the heat exchanger plates 1 disposed in the housing 3 can conduct a primary heat exchange on a first surface with the high-temperature flue gas flowing in from the flue gas inlet 71, 310 of the housing 3, and then the flue gas flows out from the flue gas outlet 320 after a secondary heat exchange with a second surface along with the flowing of the flue gas after it flows out from the flue gas guide port. On the whole, the above-mentioned heat exchanger plates 1 can fully absorb heat in the flue gas in the process of secondary heat exchange with the high-temperature flue gas, so that the water in the heat exchanger plate 1 is sufficiently heated up, and hence efficiency can be further improved.

In a specific embodiment, the heat exchanger plates 1 have the top end 11 and the bottom end 12 opposed to each other, wherein the bottom end 12 is fitted with the housing 3 to form the flue gas guide port: the flue gas is firstly in contact with the first surface of the heat exchanger plates 1 for heat exchanging after flowing in from the flue gas inlet 71, 310, and then flows out from the flue gas guide port to contact the second surface of the heat exchanger plates 1 for heat exchanging, and hence flows out from the flue gas outlet 320.

In this embodiment, the heat exchanger plates 1 can be integrally of a rectangular plate-like structure. As a matter of course, shapes of the heat exchanger plates 1 can also be another one, such as circular, trapezoidal, etc., and can be adaptively changed according to the mounting environment, which is not specifically limited herein in the present application. The top end 11 and the bottom end 12 can be two short sides of rectangle, taking the heat exchanger plates 1 being of a rectangular plate-like structure as an example. The bottom end 12 of the heat exchanger plates 1 could be formed with a groove extending towards the top end 11. When the heat exchanger plates 1 are mounted in the housing 3, the groove is fitted with the bottom wall of the housing 3 to form the flue gas guide port. After flowing in from the flue gas inlet 71, 310, the flue gas is firstly contacted with the first surface of the heat exchanger plates 1 for heat exchanging, next flows out from the flue gas guide port, then is contacted with the second surface of the heat exchanger plates 1 for heat exchanging, and hence flows out from the flue gas outlet 320. On the whole, the above-mentioned heat exchanger plates 1 can fully absorb heat in the flue gas in the process of secondary heat exchange with the high-temperature flue gas, so that the water in the heat exchanger plates 1 is sufficiently heated up.

In one embodiment, the heat exchanger plates 1 have the first end and the second end, and the fluid passage 2 is disposed reciprocally between the first end and second end.

In this embodiment, see the detailed descriptions in the above-mentioned embodiments of the heat exchanger plates for the specific arrangement and the achieved effects of the fluid passage 2 in the heat exchanger plates 1, and detailed description thereof will be omitted.

Figure 4:
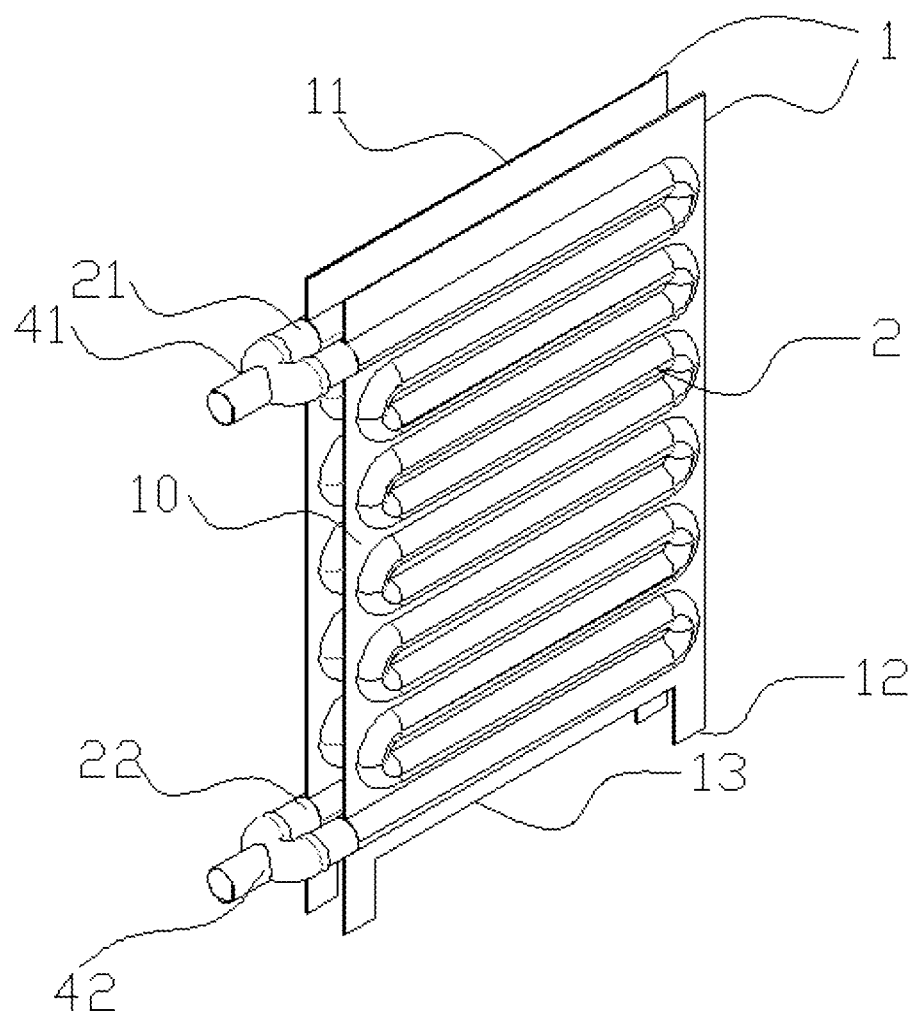
FIG. 4 is a structural diagram of a group of heat exchanger plates of a condensing heat exchanger provided in embodiments in the present application.
Figure 5:
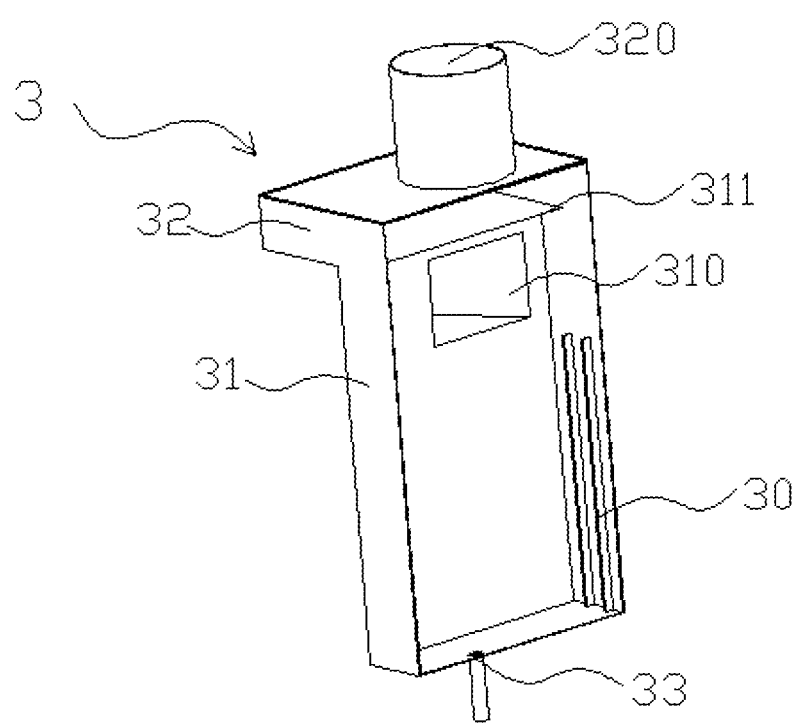
FIG. 5 is a structural diagram of a housing of a condensing heat exchanger provided in embodiments in the present application.

Referring to FIG. 4, in one embodiment, the heat exchanger plates 1 have the top end 11 and the bottom end 12 opposed to each other, the direction from the top end 11 to the bottom end 12 is a first direction, and the fluid passage 2 is reciprocally disposed along the second direction having a predetermined angle to the first direction while extending along the first direction.

In this embodiment, see the detailed descriptions in the above-mentioned embodiments of the heat exchanger plates for the specific arrangement and the achieved effects of the fluid passage 2 in the heat exchanger plates 1, and detailed description thereof will be omitted.

In this embodiment, the fluid passage 2 is reciprocally disposed along the second direction having a predetermined angle to the first direction while extending along the first direction from the top end 11 to the bottom end 12, in order to extend length of the fluid passage 2 and improve heat exchange efficiency of the heat exchanger plates 1.

Where the first direction can be the gravity direction the predetermined angle may be 90 degree, and it may certainly also be another angle. e.g., an arbitrary angle between 75 degree to 90 degree, which is not specifically limited herein in the present application.

In a specific embodiment, when the predetermined angle is 90 degree, it is more beneficial for the fluid passage 2 to be uniformly densely disposed on the heat exchanger plates 1, so as to maximally improve the heat exchange efficiency of the heat exchanger plate 1.

In a specific application scenario, the fluid passage 2 is provided with a water inlet 21 for water input and a water outlet 22 for water output, the position of the water inlet 21 is higher than that of the water outlet 22, a water stream can flow in from the water inlet 21 through the fluid passage 2 and flow out from the water outlet 22. Since the position of the water inlet 21 is higher than that of the water outlet 22, an overall flowing direction of the water stream is consistent with the gravity direction, this is beneficial in reducing resistance of the water stream in the flowing process.

In one embodiment, the fluid passage 2 is provided with the water inlet 21 for water input and the water outlet 22 for water output, the water inlet 21 is provided with a first connector, and the water outlet 22 is provided with a second connector, wherein the first connector can be communicated with a water input pipeline, and the second connector can be communicated with a main heat exchanger.

In this embodiment, referring to the above-mentioned embodiments of the heat exchanger plates for the specific configuration of the heat exchanger plates 1. To be specific, the heat exchanger plates 1 have the water inlet 21 for water input and the water outlet 22 for water output. The water inlet 21 can be provided with a first connector, and the water outlet 22 can be provided with a second connector; and the first connector can be used in communication with a water input pipeline, and the second connector can be used for communication with a main heat exchanger. In use, cold water flowing in from the water input pipeline flows into the fluid passage 2 of the heat exchanger plate 1 via the first connector, after sufficiently heat exchanging with the heat exchanger plates 1, then flows towards the main heat exchanger via the second connector to supply the heated water to the main heat exchanger, so as to achieve the object of improving efficiency.

Referring to FIG. 4, in one embodiment, the fluid passage 2 is provided with the water inlet 21 for water input and the water outlet 22 for water output, when the number of the heat exchanger plates 1 is more than one, the condensing heat exchanger further comprises a first multi-passage connector 41 and a second multi-passage connector 42 for connecting a plurality of the heat exchanger plates 1 in parallel, wherein the first multi-passage connector 41 is used to connect in parallel the water inlets 21 of the plurality of the heat exchanger plates 1; and the second multi-passage connector 42 is used to connect in parallel the water outlets 22 of the plurality of the heat exchanger plates 1.

In this embodiment, the number of the heat exchanger plates 1 in the condensing heat exchanger can be either one or more than one, when the number of the heat exchanger plates 1 is more than one, the heat exchanger plates 1 can be connected in parallel.

To be specific, the plurality of heat exchanger plates 1 can form a group of heat exchanger plates by connecting two multi-passage connectors, wherein the first multi-passage connector 41 can be connected with the water inlets 21 of the plurality of the heat exchanger plates 1, respectively, so as to introduce water from the water input pipeline into the water inlet 21 of the heat exchanger plates 1, respectively. The second multi-passage connector 42 can be connected with the water outlet 22 of the heat exchanger plates 1, respectively, so as to collect the water heated by the heat exchanger plates 1 and supply it to the main heat exchanger.

Where the number of the heat exchanger plates 1 can be adjusted according to actual needs. For example, when the condensing heat exchanger is applied in a condensing gas water heater having more liters, the heat exchanger plates 1 can be selected more in number and connected in parallel by the multi-passage connectors. When the condensing heat exchanger is applied in a condensing gas water heater having less liters, the heat exchanger plates 1 can be selected less in number and connected in parallel by the multi-passage connectors, and even the structure of a single row of heat exchanger plates 1 is also available. On the whole, when arranged by way of connecting multi-passage connectors in parallel, the heat exchanger plates 1 can be flexibly arranged according to actual needs, and this is beneficial in realizing a modular assembly.

As a matter of course, the connection manner between the heat exchanger plates 1 is not limited to the above-mentioned parallel one, and may also be one in series, or a combination of the above two, which is not specifically limited herein in the present application.

For example, when the heat exchanger plates 1 are connected in series therebetween, the water outlet of the first heat exchanger plate can be connected with the water inlet of the second heat exchanger plate.

In one embodiment, the flue gas inlet 71, 310 of the housing 3 is used to be connected with an exhaust port of a fan; the flue gas outlet 320 of the housing 3 is used to be connected with the exhaust port; the bottom of the housing 3 is provided with an outlet 33 for discharging condensed water.

In this embodiment, the flue gas inlet 71, 310 of the housing 3 can be connected with the exhaust port of the fan, and the high-temperature flue gas after flowing out from the exhaust port enters the housing 3 through the flue gas inlet 71,310. The flue gas outlet 320 of the housing 3 can be connected with the exhaust port. The high-temperature flue gas enters the housing 3 from the flue gas inlet 71, 310. After heat exchanges with the heat exchanger plates 1 in the housing 3, the high-temperature flue gas flows out from the flue gas outlet 320 and is discharged outwardly from the exhaust port.

In this embodiment, the bottom of the housing 3 can be provided with an outlet. When the high-temperature flue gas enters the housing 3 through the flue gas inlet 71, 310, a high temperature of about 180 degrees Celsius may be decreased below 100 degrees Celsius, after the flue gas is heat exchanged with the heat exchanger plates 1. A condensation may occur on the housing 3 and the heat exchanger plates 1 and thus condensed water is produced. When the condensed water is aggregated in the housing 3 and cannot be discharged in time, on the one hand, the condensed water may cause corrosions of the housing 3 due to its corrosive effects if the condensed water aggregated in the housing 3 is not discharged in time, and on the other hand, if the condensed water is aggregated in the housing 3, it would result in limitation to a flow path of the flue gas, the high-temperature flue gas fails to be sufficiently heat exchanged with the heat exchanger plates 1, and heat exchange efficiency of the condensing heat exchanger can be substantially reduced on the whole. When an outlet is arranged at the bottom of the housing 3, the produced condensed water can be discharged in time, which prevents undesired effects brought about by aggregating the condensed water.

In one embodiment, the housing 3 comprises a first part 31 for disposing the heat exchanger plates 1 and a second part 32 for collecting flue gas, the flue gas inlet 71, 310 is disposed on a wall surface of the first part 31, the flue gas outlet 320 is disposed on a wall surface of the second pan 32, and the first pan 31 is communicated with the second part 32.

In this embodiment, the housing 3 can comprise: a first part 31 for disposing the heat exchanger plates 1 and a second part 32 for collecting flue gas, wherein the outlet 33 for discharging the condensed water is disposed on the bottom wall of the housing 3; the flue gas inlet 71, 310 is disposed on the side wall of the first part 31 close to the second part 32; the flue gas outlet 320 is disposed on the second part 32, the flue gas flowing out from the first part 31 is accumulated in the second part 32 and flows out from the flue gas outlet 320, where the outlet 33 for discharging condensed water is disposed on the bottom wall to prevent condensed water from being accumulated in the housing 3.

To be specific, the second part 32 can be disposed in an upper portion of the first part 31, and the housing 3 formed by interpenetrating the second part 32 with the first part 31 can be of an inverted "L" shape and is compact in overall structure. Certainly, the overall shape construction of the housing 3 can also be other forms, those skilled in the art can make adaptive changes according to a specific mounting environment, which is not specifically limited herein in the present application.

Where the flue gas inlet 71, 310 is disposed on the side wall of the first part 31 close to the second part 32, and the flue gas outlet 320 is disposed on the second part 32. The high-temperature flue gas flows into the first part 31 from the gas inlet, and flows out from the first pan 31 after sufficiently heat exchanged with the heat exchanger plates 1 in the first part 31. The flue gas flowing out from the first part 31 is accumulated in the second part 32 and flows out from the flue gas outlet 320. On the whole, when flowing in the housing 3, the high-temperature flue gas can be efficiently heat exchanged with the heat exchanger plates 1.

In a specific embodiment, the second part 32 inwardly forms an extension portion 311 in a position where the second part 32 communicates with the first part 31 and close to one side of the flue gas inlet 71, 310; the top end 11 of the heat exchanger plate 1 closest to the flue gas inlet 71, 310 is butting the extension portion 311, when entering the housing 3 from the flue gas inlet 71, 310, the flue gas may not come out upward at the position where the second part 32 is connected with the first part 31, and all of the flue gas flows along the heat exchanger plates 1 to sufficiently heat exchange with the heat exchanger plates 1 and hence to improve the heat exchange efficiency of the condensing heat exchanger.

In one embodiment, at least one of the side wall and the bottom wall of the housing 3 is provided with a limiting member 30 for spacing the heat exchanger plates 1.

In this embodiment, at least one of the side wall and the bottom wall of the housing 3 is provided with a limiting member 30 for spacing the heat exchanger plates 1. For example, in one embodiment, a limiting member 30 is disposed on a side wall of the housing 3. Both sides of the heat exchanger plates 1 can be spaced by the limiting member 30.

Where the limiting member 30 can be fitted with the mounting portion 10 of the heat exchanger plate 1 to space the heat exchanger plate 1. To be specific, the manner by which the limiting member 30 is fitted with the mounting portion 10 can be a face-to-face engagement, a point-to-face engagement, a line-to face engagement, or the like, which is not specifically limited herein in the present application.

In one embodiment, edge of the heat exchanger plates 1 are provided with a mounting portion 10, and the mounting portion 10 of the heat exchanger plates 1 and the limiting member 30 are butting each other.

In this embodiment, edge of the heat exchanger plate 1 are provided with a mounting portion 10, and the mounting portion 10 is used for engagement with the limiting member 30 of the housing 3, in order for positioning and mounting of the heat exchanger plates 1. The mounting portion 10 can be formed at butting edge when the first metal board 14 and the second metal board 15 of the heat exchanger plates 1 are butting each other. Certainly, the mounting portion 10 can also be disposed at the edge of the heat exchanger plates 1 in a fixing manner such as welding. Specifically, the mounting portion 10 can be arranged as a circumferential protrusion of the heat exchanger plates 1 or arranged as uniformly arranged protrusions along a side of the heat exchanger plate 1, as a matter of course, the mounting portion 10 can also be other forms and can be adaptively changed according to the specific mounting environment, which is not specifically limited herein in the present application.

In this embodiment, the mounting portion 10 can realize mounting of the heat exchanger plates 1 in the housing 3 in a manner of being butting the limiting member 30. To be specific, when the mounting portion 10 is butting the limiting member 30, they can be butted in a slidable manner. For example, the limiting member 30 on the housing 3 could be formed with a slideway along a preset direction. When the heat exchanger plates 1 are mounted, the mounting portion 10 can be aligned in the slideway formed by the limiting member 30. The heat exchanger plate 1 is slidable relative to the housing 3, thus the mounting or the heat exchanger plate 1 can be realized. After the mounting of the heat exchanger plate 1 is completed, positioning of the heat exchanger plate 1 within the housing 3 can be realized by engaging the limiting member 30 with the mounting portion 10. Seen as such, the above-mentioned manner by which the mounting portion 10 is butting the limiting member 30 can efficiently realize mounting and positioning of the heat exchanger plate 1.

In a specific application scenario, the limiting member 30 can be more than one, arranged in parallel along the inner wall of the housing 3. Accordingly, the number of the heat exchanger plates 1 can be adjusted according to actual needs. For example, when a condensing gas water heater has more liters, a plurality of the heat exchanger plates 1 can be disposed in the plurality of limiting members 30 arranged side by side; and when the condensing gas water heater has less liters, the limiting members 30 matching the number of the heat exchanger plates 1 can be selected in the plurality of limiting members 30 arranged side by side. On the whole, a modular assembly can be realized between the limiting members 30 and the heat exchanger plates 1, an easy assembly and a flexible adjustment of the number of the heat exchanger plates 1 can meet demands of the condensing gas water heater having different liters.

In a specific embodiment, the limiting members 30 can be at least one of a stop surface and a stop point formed on an inner wall of the housing 3.

In this embodiment, the limiting members 30 can be a stop surface, or a stop point, or both the stop surface and the stop point formed on an inner wall of the housing 3.

Where the stop surface can be either a limiting surface inwardly formed on the inner wall of the housing 3, or a limiting surface outwardly formed on the inner wall of the housing 3. During mounting, the heat exchanger plates 1 are inserted in the housing 3 along the limiting surface, this is beneficial in improving convenience of the modular assembly of the heat exchanger plates 1.

Where the stop point can be a projection formed on the inner wall of the housing 3, and the number of the projection can be more than one and can be successively arranged along the extending direction of the housing 3 to realize spacing of the heat exchanger plates 1.

Figure 6:
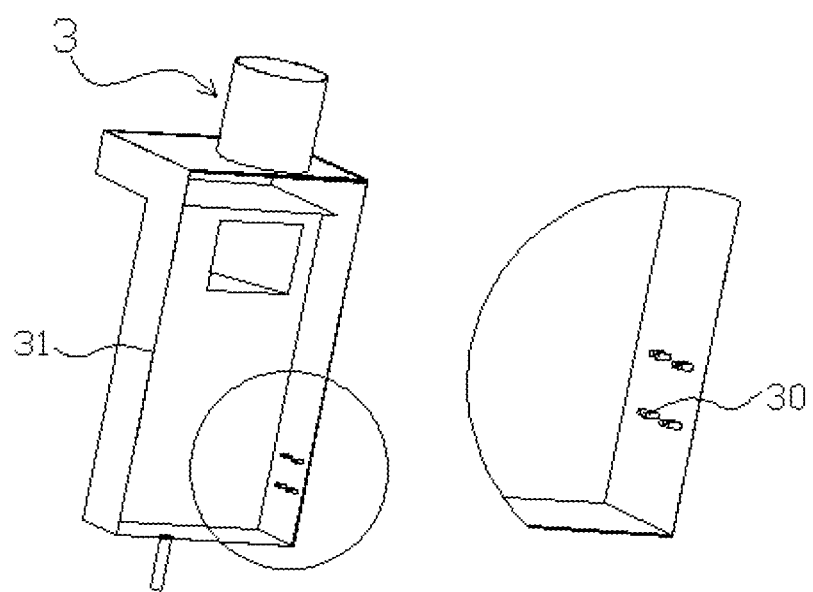
FIG. 6 is a structural diagram of a limiting member of a condensing heat exchanger provided in embodiments in the present application.

Referring to FIG. 6, in a specific embodiment, the limiting member 30 can be a lug or a screw disposed on the inner wall of the housing 3.

In this embodiment, the limiting member 30 can be a lug or a screw disposed on the inner wall of the housing 3. The number of the lug or screw can be more than one and can be successively arranged along the extending direction of the housing 3 to realize spacing of the heat exchanger plates 1. During a specific mounting, the heat exchanger plates 1 are inserted in the housing 3 along the arrangement direction of the lug or screw, thus the mounting is completed.

In one embodiment, a first flow guide portion is formed on the first metal board 14, a second flow guide portion is formed on the second metal board 15, the first metal board 14 and the second metal board 15 are butting each other to form the fluid passage 2 by the first flow guide portion and the second flow guide portion.

In this embodiment, a first flow guide portion is formed on the first metal board 14, a second flow guide portion is formed on the second metal board 15, the first metal board 14 and the second metal board 15 butting each other can form the fluid passage 2 by butting the first flow guide portion against the second flow guide portion. When both the first metal board 14 and the second metal board 15 are provided with a flow guide portion and the above-mentioned flow guide portions can be fitted with each other to integrally form the fluid passage 2, it is possible to increase a circulation volume of the fluid passage 2 in the heat exchanger plates 1, and hence improve the heat exchange efficiency of the condensing heat exchanger.

Specifically, a section of the first flow guide portion can be semi-circular and a section of the second flow guide portion can be semi-circular as well. When the first flow guide portion is fitted with the second flow guide portion, the semicircles are butting each other to form a circular fluid passage 2. The circular fluid passage 2 has a smaller resistance to a water stream on the whole, and therefore the water stream can flow in the heat exchanger plates 1 with less resistance.

In one embodiment, the heat exchanger plates 1 are arranged facing the flue gas inlet 71, 310, and have a predetermined distance to the flue gas inlet 71, 310.

In this embodiment, the heat exchanger plates 1 can be disposed in the position directly facing the flue gas inlet 71, 310 at the predetermined distance to the flue gas inlet 71, 310. The predetermined distance is used for circulation of the flue gas, and the specific magnitude of its distance can be accordingly set according to practical application scene, which is not specifically limited herein in the present application. The heat exchanger plates 1 are fitted with the housing 3 to form a flue gas passage where high-temperature flue gas flows. When entering the housing 3 from the flue gas inlet 71, 310, the high-temperature flue gas needs to flow along the flowing direction of the flue gas passage, so as to efficiently heat exchange with the heat exchanger plates 1. During specific heat exchange, when the high-temperature flue gas flows in the flue gas passage, all of the high-temperature flue gas can flow along a surface of the heat exchanger plates 1, and when the flue gas flows, the flue gas flows can be fully contacted with the projection of the fluid passage 2 of the heat exchanger plates 1 and compartments between the projections for heat exchanging, so as to fully pass heat energy to the heat exchanger plates 1, and therefore the condensing heat exchanger in the present application has excellent heat exchange efficiency.

Specifically, the flue gas inlet 71, 310 can be located at the opposing upper portion of the housing 3, the heat exchanger plates 1 can be disposed in the position close to the flue gas inlet 71, 310, and a seal structure is formed between the heat exchanger plates 1 and the top of the flue gas inlet 71, 310. The structure that the above-mentioned heat exchanger plates 1 are fitted with the housing 3 can force the high-temperature flue gas flowing in from the flue gas inlet 71, 310 to only flow downwardly along the surface of the heat exchanger plates 1 and then to flow upwardly to heat exchange with the heat exchanger plates 1 over and over again, so that the high-temperature flue gas can fully come into contact with the heat exchanger plates 1 for heat exchanging to improve heat exchange efficiency of the condensing heat exchanger.

In one embodiment, the number of the heat exchanger plates 1 is at least two, and two neighboring heat exchanger plates 1 are connected to each other by way of serial or parallel connection.

In this embodiment, the number of the heat exchanger plates 1 can be two or more, specifically, the number of the heat exchanger plates 1 can be determined according to actual use requirements, which is not specifically limited herein in the present application. For example, when the condensing heat exchanger should be placed in a water heater, the number of the heat exchanger plates 1 can increase as the volume of the water heater increases.

When the number of the heat exchanger plates 1 is at least two, two neighboring heat exchanger plates 1 are connected to each other by way of serial or parallel connection. Specifically, when two neighboring heat exchanger plates 1 are connected by way of serial connection, the water inlets of the second heat exchanger plate can be connected with the water outlets of the first heat exchanger plate. In use, after flowing through the fluid passage, the water stream entered from the water inlet of the first heat exchanger plate flows out from of its water outlet, then enters the fluid passage of the second heat exchanger plate through the water inlet of the second heat exchanger plate, and then flows out from the water outlet of the second heat exchanger plate, wherein connections of the water inlet and the water outlet of two heat exchanger plates 1 can be achieved directly by way of grafting, welding, or in a manner in which connections can be achieved by way of connectors, which is not specifically limited herein in the present application. When two neighboring heat exchanger plates 1 are connected by way of parallel connection, the water inlet and the water outlet of each heat exchanger plate can be connected in parallel, respectively.

In a specific embodiment, the fluid passage 2 of the heat exchanger plate 1 is provided with a water inlet 21 for water input and a water outlet 22 for water output, and when the number of the heat exchanger plates 1 is more than one, a plurality of the water inlets 21 are connected in parallel, and a plurality of the water outlets 22 are connected in parallel.

In this embodiment, the corresponding circulation passage 2 of the heat exchanger plate 1 can be provided with the water inlet 21 for water input and the water outlet 22 for water output, water can enter the fluid passage 2 of the heat exchanger plate 1 from the water inlet 21 and finally flow out from the water outlet 22. When the number of the heat exchanger plate 1 is more than one, the plurality of water inlets 21 can be connected in parallel, respectively, and the plurality of water outlets 22 are connected in parallel to realize an arrangement in parallel for a plurality of heat exchanger plates 1. After water flowing in from the water inlet is splinted in the position of the water inlets connected in parallel, the water flows in the fluid passage 2 of each heat exchanger plate 1 respectively, and finally is converged at the water outlets connected in parallel.

In one specific application scenario, the condensing heat exchanger can further comprise: a first communication member and a second communication member, wherein the first communication member goes across the water inlets 21 of the plurality of the heat exchanger plates 1, provided with a first opening that can be communicated with the water inlet 21 of each of the heat exchanger plates 1; and the second communication member goes across the water outlets 22 of the plurality of the heat exchanger plates 1, provided with a second opening that can be communicated with the water outlet 22 of each of the heat exchanger plates 1.

In this embodiment, the condensing heat exchanger can be further provided with a first communication member and a second communication member, wherein the first communication member is used to connect the water inlets 21 of the plurality of the heat exchanger plates 1 in parallel.

Figure 7:
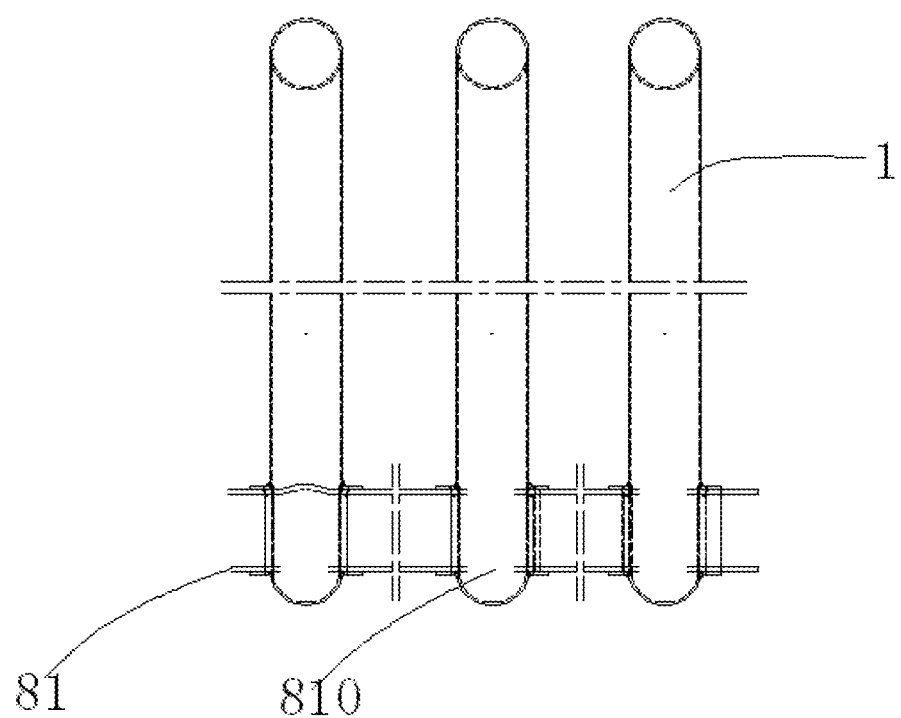
FIG. 7 is a structural diagram of a combination of plural pieces of heat exchanger plates of a condensing heat exchanger provided in embodiments in the present application.

Referring to FIG. 7, specifically, the first communication member 81 can be a hollow pipe section, one end thereof can be connected with the water inlet end. A plurality of the first openings 810 can be provided on a tube wall of the first communication member 81. The number of the first openings 810 is equal to that of the heat exchanger plates 1. The first communication member 81 goes across the plurality of the heat exchanger plates 1, and the first openings 810 on its tube wall match the water inlets 22 of the heat exchanger plates 1, respectively, to realize connections of the above two. Likewise, referring to the first communication member 81 for the structure of the second communication member, it is used for the communication of the water outlets 22 of the plurality of heat exchanger plates 1 in parallel. Specifically, the second communication member can be a hollow pipe section, one end thereof can be connected with the water inlet end. A plurality of the second openings can be provided on a tube wall of the second communication member. The number of the second openings is equal to that of the heat exchanger plates 1. The second communication member goes across the plurality of the heat exchanger plates 1, and the second openings on its tube wall match the water outlets 22 of the heat exchanger plates 1, respectively, to realize connections of the above two.

In another specific application scenario, the condensing heat exchanger comprises: at least one first sub-connector and at least one second sub-connector; the first sub-connectors are used for the communication of the water inlets 21 of the two neighboring heat exchanger plates 1; and the second sub-connectors are used for the communication of the water outlets 22 of the two neighboring heat exchanger plates 1.

In this embodiment, the condensing heat exchanger can also achieve a parallel connection of a plurality of the heat exchanger plates 1 by arranging the first sub-connector and the second sub-connector.

Figure 8:
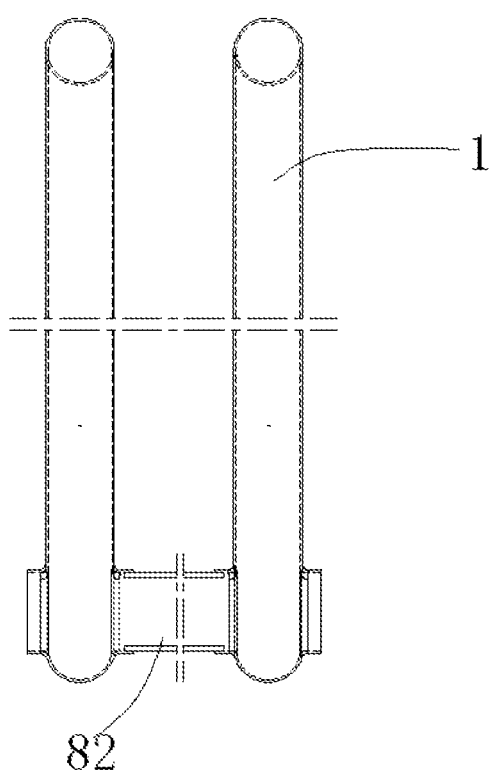
FIG. 8 is a structural diagram of a combination of plural pieces of heat exchanger plates of another condensing heat exchanger provided in embodiments in the present application.

Referring to FIG. 8, specifically, the first sub-connectors 82 are used to communicate with the water inlets 21 of the two neighboring heat exchanger plates 1. The first sub-connectors 82 can be a hollow pipe section, having two opening ends opposed to each other, wherein one end is connected with the water inlet of one heat exchanger plate, and the other end is connected with the water inlet of another heat exchanger plate. The position where the first sub-connectors 82 are fitted with the water inlet 21 of the heat exchanger plates 1 is fixedly connected by way of braze welding. Likewise, also referring to the first sub-connectors 82 for the structure of the second sub-connectors, it is useful for the communication of the water outlets 22 of the two neighboring heat exchanger plates 1. The second sub-connectors can be a hollow pipe section, having two opening ends opposed to each other, wherein one end is connected with the water outlet of one heat exchanger plate; and the other end is connected with the water outlet of another heat exchanger plate. The position where the second sub-connectors are fitted with the water outlet 22 of the heat exchanger plates 1 is fixedly connected by way of braze welding.

In another specific application scenario, the water inlets 21 and the water outlets 22 of the heat exchanger plates 1 are formed with circumferential projection portion, respectively, the projection portions in the position of the water inlet 21 of the two neighboring heat exchanger plates 1 are butting each other, and the projection portions in the position of the water outlet 22 of the two neighboring heat exchanger plates 1 are butting each other.

In this embodiment, circumferential projection portion can be respectively formed on the water inlet 21 and the water outlet 22 of the heat exchanger plates 1, a connection in parallel between a plurality of the heat exchanger plates 1 can be realized using the circumferential projection portion.

Figure 9:
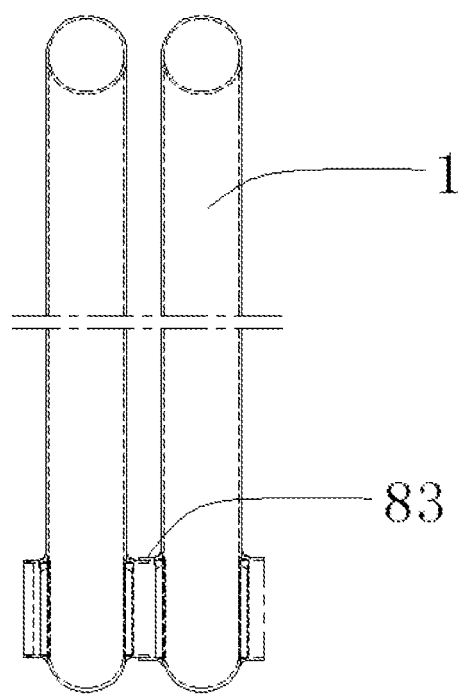
FIG. 9 is a structural diagram of a combination of plural pieces of heat exchanger plates of another condensing heat exchanger provided in embodiments in the present application.

Referring to FIG. 9, specifically, the circumferential projection portion 83 formed on the water inlet 21 of the heat exchanger plates 1 can be a turnup formed at the water inlet 21. After the turnup is butted at the water inlet 21 of two neighboring heat exchanger plates 1, it is possible to achieve connections of the water inlets 21 of two beat exchanger plates 1. Likewise, referring to the structure of the position of water inlet 21 of the heat exchanger plates 1 for the circumferential projection portion formed on the water outlet 22 of the heat exchanger plates 1, which can be the turnup formed at the water outlet 22. After the turnup is butted at the water outlet 22 of two neighboring heat exchanger plates 1, it is possible to achieve a connection of the water outlets 22 of two heat exchanger plates 1. When the water inlet 21 and the water outlet 22 of the plurality of the heat exchanger plates 1 are butted for communication, it is possible to achieve a parallel connection between the heat exchanger plates 1.

As a matter of course, the manner by which the heat exchanger plates 1 are connected in parallel is not limited to the above-mentioned examples; those skilled in the art can also make other changes under the enlightenment of the technical spirit of the present application, as long as the implemented functions and the achieved effects therein are identical or similar to those in the present application, and should be covered in the protection scope of the present application.

Figure 10:
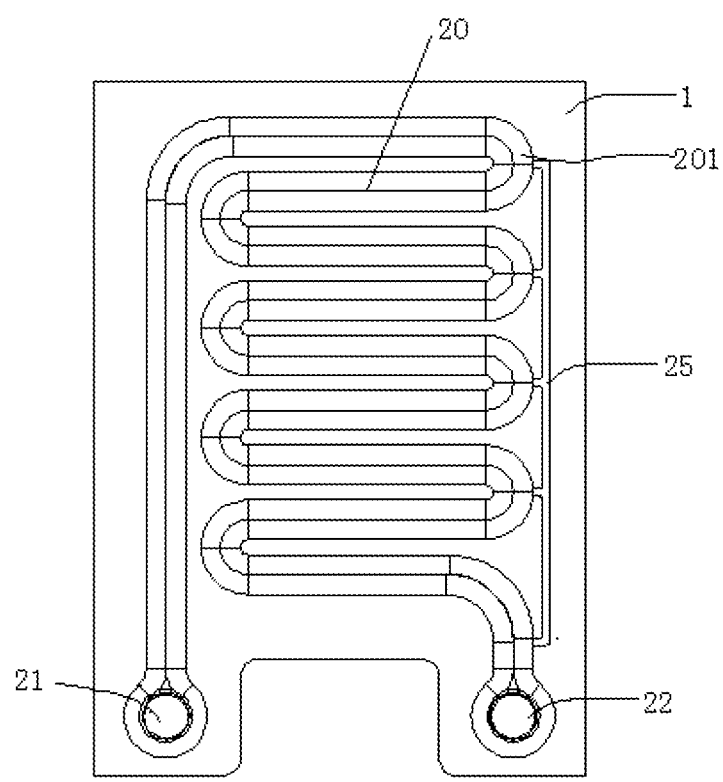
FIG. 10 is a structural diagram of a condensing heat exchanger with a communication fluid passage provided in embodiments in the present application.
Figure 11:
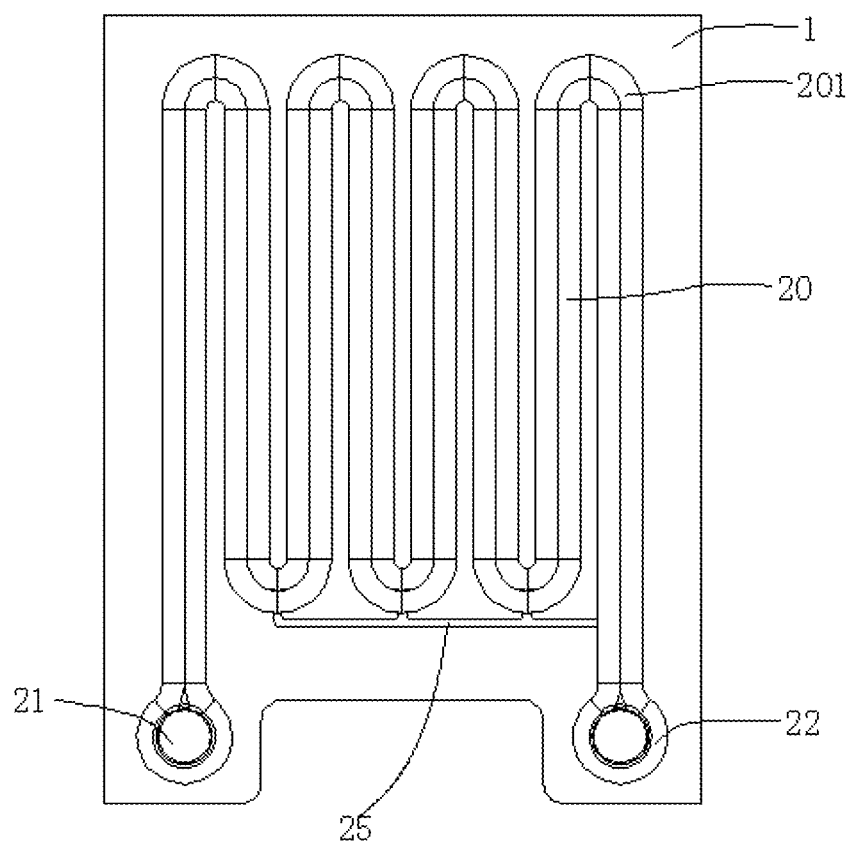
FIG. 11 is a structural diagram of another condensing heat exchanger with a communication fluid passage provided in embodiments in the present application.

Referring to FIG. 10 to FIG. 11, in one embodiment, the fluid passage 2 is reciprocally disposed, comprising: sub-fluid passages 20 and a transition portion 201 communicating with two neighboring sub-fluid passages 20; a communication fluid passage 25 communicating the transition portion 201 with the water outlet 22 of the fluid passage 2 is disposed on the heat exchanger plates 1.

In this embodiment, the fluid passage 2 can be reciprocally disposed along a predetermined direction, to increase the circulation area of the fluid passage 2. Specifically, the circulation passage 2 can include sub-fluid passages 20 extending in the predetermined direction and a transition portion 201 communicating with two neighboring sub-fluid passages 20. The fluid passage 2 can be reciprocally disposed along the horizontal direction, the gravity direction or the direction having a predetermined angle to the gravity direction, which is not specifically limited herein in the present application.

When the condensing heat exchanger does not operate, particularly, in the winter at that time when the temperature is relatively lower, it is expected to discharge the water in the heat exchanger plates 1 to prevent water from freezing, which results in explosion of the heat exchanger plates 1. However, in general, water has a certain flow resistance when flowing in the sub-fluid passages 20, particularly when the transition portion 201 of the fluid passage 2 accumulates water nearby, it is difficult to discharge the water by itself. In this case, by disposing a communication passage 25 on the heat exchanger plates 1, one end thereof can be connected with the water outlet 22, and the other end can be provided with a plurality of openings used to be connected with the transition portion 201, so that the accumulated water difficulty discharged is discharged via the water outlet 22.

Referring to FIG. 11, in a specific embodiment, the fluid passage 2 is reciprocally disposed vertically in the gravity direction, the sub-fluid passages 20 are extending in the gravity direction, and the communication passage 25 is disposed close to a lower end of the heat exchanger plates 1 and located in the position below the transition portion 201.

In this embodiment, the fluid passage 2 can be reciprocally disposed up and down in the gravity direction, and accordingly, the sub-fluid passages 20 are also entirely extending along the gravity direction, and the transition part 201 is separately positioned near an upper end and a lower end of the heat exchanger plates 1. As extending along the gravity direction, the sub-fluid passages 20 are fitted with the transition part 201 to subsequently form a U-shape structure. The water circulated in the heat exchanger plates 1 is easily accumulated in the U-shape structure and is difficulty discharged. In this case, when the communication passage 25 is disposed in the position where the fluid passage 2 is disposed close to a lower end of the heat exchanger plates 1 and located in the position below the transition portion 201, the water in the U-shape structure can be smoothly discharged at the water outlet 22 where the water flows to the fluid passage 2 through the communication passage 25.

Further, a sectional dimension of the communication passage 25 is less than that of the sub-fluid passages 20.

In this embodiment, the section of the communication passage 25 can be a circle, or other shapes, which is not specifically limited herein in the present application. As the communication passage 25 is used as a bypass pipe for discharging the accumulated water in the fluid passage 2, its sectional dimension can be less than that of the sub-fluid passages 20 for preventing the communication passage 25 from transiting and splitting the sub-fluid passages 20, which ensures that when the condensing heat exchanger normally runs, a vast majority of the water flows in the sub-fluid passages 20 of the fluid passage 2.

A condensing gas water heater 100 is additionally provided in embodiments of the present application, comprising the condensing heat exchanger in any of the above-mentioned embodiments, as a matter of course, it also can achieve the corresponding technical effect in the above-mentioned embodiments.

Figure 12:
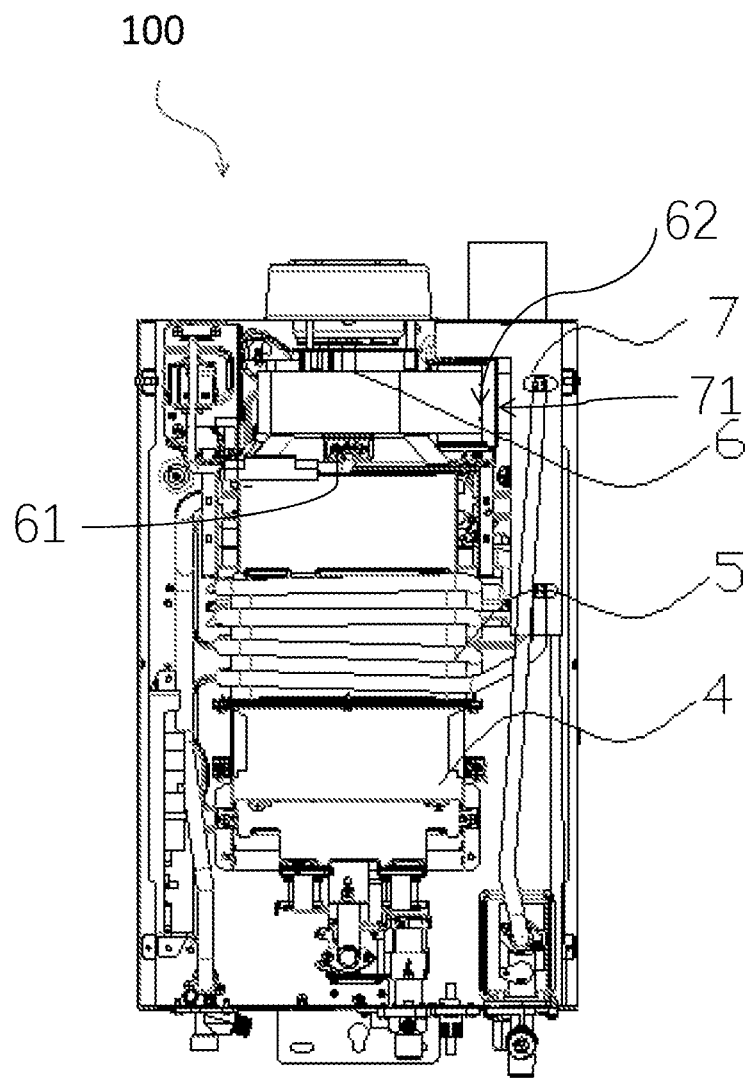
FIG. 12 is a structural diagram of a condensing gas water heater provided in embodiments in the present application.

Referring to FIG. 12, in one embodiment, the condensing gas water heater 100 further comprises: a combustor 4; a main heat exchanger 5 communicated with the condensing heat exchanger 7; a frequency conversion fan 6 capable of driving air into the gas water heater 100; the flue gas generated during operation of the combustor is discharged from the gas water heater 100 after sequentially passing through the main heat exchanger 5 and the condensing heat exchanger 7; and a control unit capable of controlling an operation of the frequency conversion fan 6 according to a size of thermal load of the combustor 4.

In this embodiment, the condensing gas water heater 100 is provided with the combustor 4 and the main heat exchanger 5, and the combustor 4 is used to heat up the water in the main heat exchanger 5. The main heat exchanger 5 is connected with the condensing heat exchanger 7, and the water heated by the high-temperature flue gas produced through burning of the combustor 4 in the condensing heat exchanger 7 is supplied to the main heat exchanger 5.

The frequency conversion fan 6 can be used for driving air into the gas water heater 100, that is, being capable of supplying to the combustor 4 air required for burning. In addition, the frequency conversion fan 6 can extract out the high-temperature flue gas generated by the combustor 4, the high-temperature flue gas is discharged from the condensation gas water heater 100 after sequentially passing through the main heat exchanger 5 and the condensing heat exchanger 7.

In this embodiment, a signal input end of the frequency conversion fan 6 is electrically connected with the control unit. The control unit can control an operation of the frequency conversion fan 6 according to the magnitude of the thermal load of the combustor 4. Specifically, the control unit can calculate the thermal load of the combustor 4 according to the prearranged signals detected by the detection unit. Then according to the calculated thermal load of the combustor 4, a rotating speed of the frequency conversion fan 6 is adjusted so that the operating status of the frequency conversion fan 6 matches with the calculated thermal load of the combustor 4, and then it ensures that the combustor 4 has a rational firing state.

In one embodiment, the frequency conversion fan 6 is communicated with the main heat exchanger 5 and the condensing heat exchanger 7, the frequency conversion fan 6 comprises a fan inlet 61 and a fan outlet 62, and the fan outlet 62 is communicated with the flue gas inlet 71, 310 of the condensing heat exchanger 7.

In this embodiment, the frequency conversion fan 6 can be communicated with the main heat exchanger 5 and the condensing heat exchanger 7. Specifically, the fan 6 has a body, and a fan inlet 61 and a fan outlet 62 disposed on the body, wherein the fan outlet 62 is connected with the flue gas inlet 71, 310 of the condensing heat exchanger 7. The high-temperature flue gas produced when the combustor 4 heats up the main heat exchanger 5 can flow in from the fan inlet 61 as the fan 6 rotates and flow out from the fan outlet 62, then enter the condensing heat exchanger 7 through the flue gas inlet 71, 310 of the condensing heat exchanger 7 to heat exchange with the heat exchanger plates 1 inside the condensing heat exchanger 7.

In one embodiment, the condensing gas water heater 100 further comprises: a wind pressure sensor assembly for detecting a pressure signal upstream an impeller of the frequency conversion fan 6, and a signal output end of the wind pressure sensor assembly is connected with the control unit, and the control unit comprises: a memory storing a corresponding relationship between the pressure signal upstream the impeller of the frequency conversion fan 6 and the thermal load of the combustor 4, and a controller capable of controlling the operation of the frequency conversion fan 6 in accordance with the corresponding relationship.

In this embodiment, the control unit can comprise a memory storing a corresponding relationship between the pressure signal upstream the impeller of the frequency conversion fan 6 and the thermal load of the combustor 4, and a controller controlling the operation of the frequency conversion fan 6 in accordance with the corresponding relationship.

The pressure sensor assembly is used to detect a pressure signal upstream the impeller of the frequency conversion fan 6. A signal output end of the wind pressure sensor assembly is connected with the control unit. The pressure signal detected in real time or periodically by the wind pressure sensor assembly can be transferred to the control unit.

The control unit can obtain the current thermal load of the combustor 4 according to the operating condition of the condensation gas water heater 100. Further, according to the current thermal load and the corresponding relationship between the pressure signal and the thermal load, the target pressure signal of the frequency conversion fan 6 is determined.

The control unit can make a comparison of the target pressure signal with the current pressure signal obtained by the pressure sensor assembly, when there exists a larger difference between the current pressure signal and the target pressure signal, the rotating speed of the speed-changing fan 6 can be adjusted, so that the current pressure signal tends to be the target pressure signal, and then it ensures that the combustor 4 has a rational firing state.

Each of the above-mentioned embodiments in this specification is described in a progressive manner, the identical or similar portion is cross-referenced between embodiments, and a difference of each embodiment from other embodiments is stressed.

The foregoing is only several embodiments of the present invention, although the embodiments herein are disclosed as above, the content is for purposes of illustration only and not to be construed as a limitation of the invention. Those skilled in the art can make various modifications and variations of forms and details of the embodiments without departing from the spirit and scope disclosed in the invention, however, the protection scope of the invention shall be defined by the appended claims.

The invention claimed is:

1. A condensing water heater, characterized by comprising: a condensing heat exchanger including a housing and at least one heat exchanger plate disposed in the housing;
a combustor;
a main heat exchanger communicated with the condensing heat exchanger;
a frequency conversion fan capable of driving air into the condensing water heater, the flue gas generated during operation of the combustor is discharged from the gas water heater after sequentially passing through the main heat exchanger and the condensing heat exchanger;
a control unit capable of controlling operation of the frequency conversion fan according to a magnitude of thermal load of the combustor;
wherein the frequency conversion fan is communicated with the main heat exchanger and the condensing heat exchanger, the frequency conversion fan including a fan inlet and a fan outlet;
wherein the at least one heat exchanger plate comprises a first metal board and a second metal board butting each other, wherein a surface of the first metal board and a surface of the second metal board which butt each other are butting surfaces, and two outer surfaces opposite to the butting surfaces are a first surface and a second surface, respectively;
wherein at least one of the first metal board and the second metal board are formed with a convex flow guide portion along a direction away from the butting surface; the convex flow guide portion of the at least one of the first metal board and the second metal board form a fluid passage;
wherein the housing is provided with a flue gas inlet and a flue gas outlet, flue gas can flow into from the flue gas inlet, contact and exchange heat with the first surface and/or the second surface of the at least one heat exchanger plate, and flow out of the flue gas outlet; and
wherein the fan outlet of the frequency conversion fan is communicated with the flue as inlet of the condensing heat exchanger.

2. The condensing water heater as claimed in claim 1, characterized in that, the at least one heat exchanger plate is fitted with the housing to form a flue gas passage that enables flue gas to flow along a predetermined direction, and
the flue gas flows into from the flue gas inlet, contacts and exchanges heat with the first surface and/or second surface when flowing through the flue gas passage, and flows out from the flue gas outlet.

3. The condensing water heater as claimed in claim 2, characterized in that, the at least one heat exchanger plate have a first end and a second end opposite to each other, wherein at least one of the first end and the second end is fitted with the housing to form a flue gas guide port.

4. The condensing water heater as claimed in claim 3, characterized in that, the position of the first end of the at least one heat exchanger plate is higher than that of the second end, and the second end is fitted with the housing to form the flue gas guide port; and
after flowing in from the flue gas inlet, the flue gas firstly contacts and exchanges heat with the first surface of the at least one heat exchanger plate, next flows out from the flue gas guide port, then contacts and exchanges with the second surface of the at least one heat exchanger plate, and flows out from the flue gas outlet.

5. The condensing water heater as claimed in claim 1, characterized in that, the at least one heat exchanger plate have a first end and a second end, and the fluid passage is disposed reciprocally between the first end and second end.

6. The condensing water heater as claimed in claim 5, characterized in that, the first end is a top end, the second end is a bottom end, and the direction from the top end to the bottom end is a first direction, and
the fluid passage is reciprocally disposed, the fluid passage including a plurality of sub-fluid passages, each sub-fluid passage extending along a second direction having a predetermined angle to the first direction while the fluid passage extends along the first direction.

7. The condensing water heater as claimed in claim 6, characterized in that, the predetermined angle is 90 degree.

8. The condensing water heater as claimed in claim 1, characterized in that, the fluid passage is provided with a water inlet for water input and a water outlet for water output, the water inlet is provided with a first connector, and the water outlet is provided with a second connector; and
wherein the first connector can be communicated with a water input pipeline, and the second connector can be communicated with a main heat exchanger.

9. The condensing water heater as claimed in claim 1, characterized in that, the at least one heat exchanger plate includes two or more heat exchanger plates, wherein the fluid passage is provided with a water inlet for water input and a water outlet for water output when the at least one heat exchanger plate includes the two or more heat exchanger plates, the condensing heat exchanger further comprises a first multi-passage connector and a second multi-passage connector for connecting the two or more heat exchanger plates in parallel, wherein
the first multi-passage connector is used to connect the water inlets of the two or more heat exchanger plates in parallel; and
the second multi-passage connector is used to connect the water outlets of the two or more heat exchanger plates in parallel.

10. The condensing water heater as claimed in claim 1, characterized in that, the flue gas inlet of the housing is configured for communication with a smoke exhaust port of a fan; the flue gas outlet of the housing is configured for communication with the smoke exhaust port; and a bottom of the housing is provided with an outlet for discharging condensed water.

11. The condensing water heater as claimed in claim 1, characterized in that, the housing comprises a first part for disposing the at least one heat exchanger plate and a second part for collecting flue gas, the flue gas inlet is disposed on a wall surface of the first part, the flue gas outlet is disposed on a wall surface of the second part, and the first part is communicated with the second part.

12. The condensing water heater as claimed in claim 1, characterized in that, a side wall and/or a bottom wall of the housing is provided with at least one limiting member for limiting the at least one heat exchanger plate.

13. The condensing water heater as claimed in claim 12, characterized in that, an edge of the at least one heat exchanger plate is provided with a mounting portion, and the mounting portion of the at least one heat exchanger plate and the limiting member butt each other.

14. The condensing water heater as claimed in claim 12, characterized in that, the limiting member is at least one of a stop surface and a stop point formed on an inner wall of the housing, or a lug or a screw disposed on the inner wall of the housing.

15. The condensing water heater as claimed in claim 1, characterized in that, the convex flow guide portion is a first flow guide portion formed on the first metal board, a second flow guide portion is formed on the second metal board, the first metal board and the second metal board form the fluid passage by butting the first flow guide portion and the second flow guide portion.

16. The condensing water heater as claimed in claim 1, characterized in that, the at least one heat exchanger plate is disposed to face the flue gas inlet, and have a predetermined distance to the flue gas inlet.

17. The condensing water heater as claimed in claim 1, characterized in that, the at least one heat exchanger plate includes at least two or more heat exchanger plates, and two neighboring heat exchanger plates of the at least two or more heat exchanger plates are connected to each other by way of serial or parallel connection.

18. The condensing water heater as claimed in claim 17, characterized in that, the fluid passage of each of the at least two or more heat exchanger plates is provided with a water inlet for water input and a water outlet for water output, and the water inlet of each of the at least two or more heat exchanger plates are connected in parallel, and the water outlet of each of the at least two or more heat exchanger plates are connected in parallel.

19. The condensing water heater as claimed in claim 18, characterized in that, the condensing heat exchanger comprises: a first communication member and a second communication member;
the first communication member goes across the water inlets of the at least two or more heat exchanger plates, and is provided with a first opening that can be communicated with the water inlet of each of the at least two or more heat exchanger plates; and
the second communication member goes across the water outlets of the at least two or more heat exchanger plates, provided with a second opening that can be communicated with the water outlet of each of the at least two or more heat exchanger plates.

20. The condensing water heater as claimed in claim 18, characterized in that, the condensing heat exchanger comprises: at least one first sub-connector and at least one second sub-connector;
the first sub-connectors are used for the communication of the water inlets of the two neighboring heat exchanger plates; and
the second sub-connectors are used for the communication of the water outlets of the two neighboring heat exchanger plates.

21. The condensing water heater as claimed in claim 18, characterized in that, the water inlet and the water outlet of each of the at least two or more heat exchanger plates are formed with circumferential projection portion, respectively,
the projection portions at the water inlet position of the two neighboring heat exchanger plates butt each other, and
the projection portions at the water outlet position of the two neighboring heat exchanger plates butt each other.

22. The condensing water heater as claimed in claim 1, characterized in that, the fluid passage is reciprocally disposed and comprises sub-fluid passages, wherein the sub-fluid passages include two neighboring sub-fluid passages, the fluid passage further comprising a transition portion for communicating the two neighboring sub-fluid passages; the at least one heat exchanger plate is provided with a communication fluid passage which communicates the transition portion with a water outlet of the fluid passage.

23. The condensing water heater as claimed in claim 22, characterized in that, the at least one heat exchanger plate has a top end and a bottom end, and a direction from the top end to the bottom end is a gravity direction, wherein the fluid passage is reciprocally disposed in a horizontal direction perpendicular to the gravity direction, the sub-fluid passages are extending in the gravity direction, and the communication fluid passage is disposed close to the bottom end of the at least one heat exchanger plate and located in a position below the transition portion.

24. The condensing water heater as claimed in claim 22, characterized in that, a sectional dimension of the communication fluid passage is less than that of the sub-fluid passages.

25. The condensing gas water heater as claimed in claim 1, characterized by further comprising:
a wind pressure sensor assembly for detecting a pressure signal upstream an impeller of the frequency conversion fan, and a signal output end of the wind pressure sensor assembly connects with the control unit; and
the control unit comprises: a memory storing a corresponding relationship between the pressure signal upstream the impeller of the frequency conversion fan and the thermal load of the combustor; and a controller capable of controlling the operation of the frequency conversion fan in accordance with the corresponding relationship.

* * * * *